(12) United States Patent
Arai

(10) Patent No.: US 7,173,890 B2
(45) Date of Patent: Feb. 6, 2007

(54) WOBBLING SIGNAL DEMODULATION METHOD, WOBBLING SIGNAL DEMODULATION CIRCUIT, AND OPTICAL DISK DRIVE

(75) Inventor: Kuniaki Arai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/933,522

(22) Filed: Sep. 3, 2004

(65) Prior Publication Data
US 2005/0078588 A1  Apr. 14, 2005

Related U.S. Application Data

(63) Continuation of application No. PCT/JP2004/005790, filed on Apr. 22, 2004.

(30) Foreign Application Priority Data
Oct. 9, 2003  (JP) ............... 2003-350633

(51) Int. Cl.
*G11B 7/005* (2006.01)
(52) U.S. Cl. ............... 369/47.22; 369/53.34
(58) Field of Classification Search ............... None
See application file for complete search history.

(56) References Cited

U.S. PATENT DOCUMENTS

| 6,345,018 B1* | 2/2002 | Maegawa et al. ......... 369/44.13 |
| 2003/0214887 A1* | 11/2003 | Mashimo ............... 369/47.17 |
| 2004/0071228 A1* | 4/2004 | Nakata et al. .......... 375/336 |
| 2004/0174805 A1* | 9/2004 | Ishibashi et al. ........ 369/275.4 |

FOREIGN PATENT DOCUMENTS

| JP | 9-297969 | 11/1997 |
| JP | 10-69646 | 3/1998 |
| JP | 2001-52446 | 2/2001 |
| JP | 2002-74660 | 3/2002 |
| JP | 2002-124043 | 4/2002 |
| JP | 2003-157537 | 5/2003 |
| JP | 2003-203356 | 7/2003 |
| JP | 2004-178770 | 6/2004 |

OTHER PUBLICATIONS

Machine translation of JP 2002-074660.*

* cited by examiner

*Primary Examiner*—Andrea Wellington
*Assistant Examiner*—Lixi Chow
(74) *Attorney, Agent, or Firm*—Dickstein Shapiro LLP

(57) ABSTRACT

A wobbling signal demodulation method is disclosed that is capable of fast and precisely demodulating a wobbling signal without increasing cost of the circuit. The wobbling signal is obtained based on light reflected from a recording surface of an optical disk having a wobbling track formed thereon, and includes a carrier portion having a predetermined basic period and a phase demodulated wave portion including predetermined information. The wobbling signal demodulation method includes a first step of respectively integrating a portion of the wobbling signal corresponding to a first half of the basic period and a portion of the wobbling signal corresponding to a second half of the basic period in synchronization with a clock signal generated from the carrier portion; a second step of generating a digital signal based on a first integration result corresponding to the first half of the basic period and a second integration result corresponding to the second half of the basic period; and a third step of performing a phase demodulation on the phase demodulated wave portion of the wobbling signal based on the digital signal and the clock signal.

10 Claims, 23 Drawing Sheets

FIG.6

| INFORMATION FRAME NO. | SYNC. INFORMATION AREA | | ADIP INFORMATION AREA |
|---|---|---|---|
| | Nw 0 | Nw 1-3 | Nw 4-7 |
| FRAME NO.1 | word sync | | |
| FRAME NO.2 | bit sync | | DATA BIT 1 |
| FRAME NO.3 | bit sync | | DATA BIT 2 |
| FRAME NO.4 | bit sync | | DATA BIT 3 |
| FRAME NO.5 | bit sync | | DATA BIT 4 |
| FRAME NO.6 | bit sync | | DATA BIT 5 |
| FRAME NO.7 | bit sync | | DATA BIT 6 |
| FRAME NO.8 | bit sync | | DATA BIT 7 |
| ⋮ | ⋮ | | ⋮ |
| FRAME NO.49 | bit sync | | DATA BIT 48 |
| FRAME NO.50 | bit sync | | DATA BIT 49 |
| FRAME NO.51 | bit sync | | DATA BIT 50 |
| FRAME NO.52 | bit sync | | DATA BIT 51 |

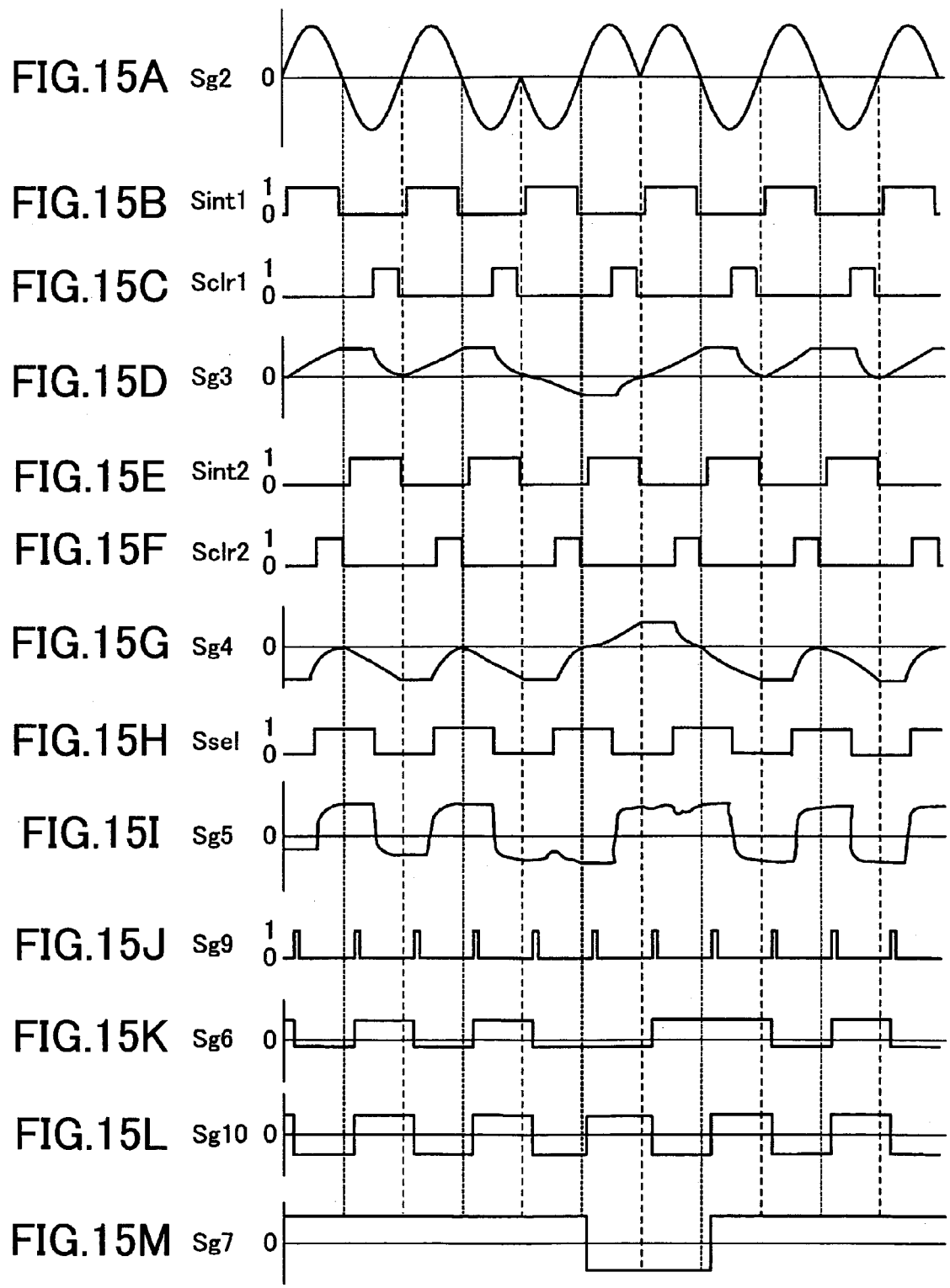

FIG.20A Sint1
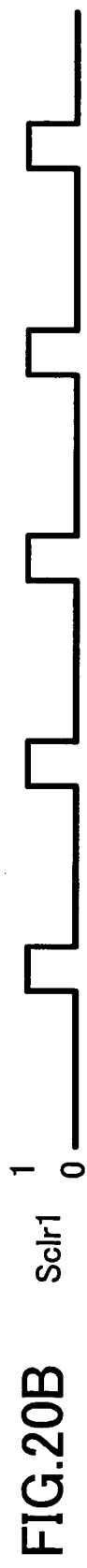
FIG.20B Sclr1
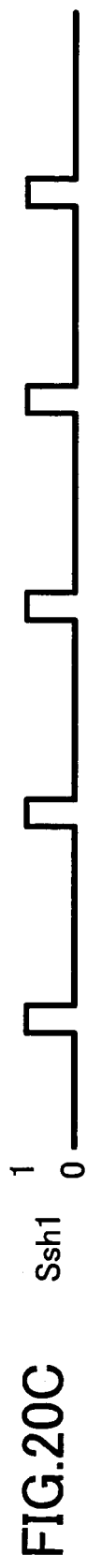
FIG.20C Ssh1
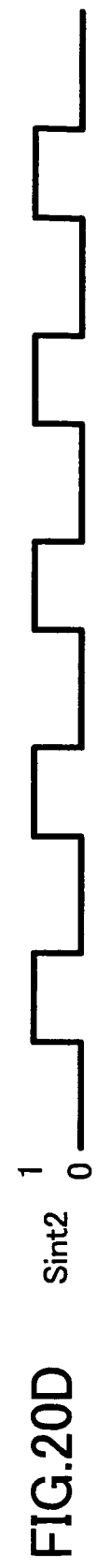
FIG.20D Sint2
FIG.20E Sclr2
FIG.20F Ssh2

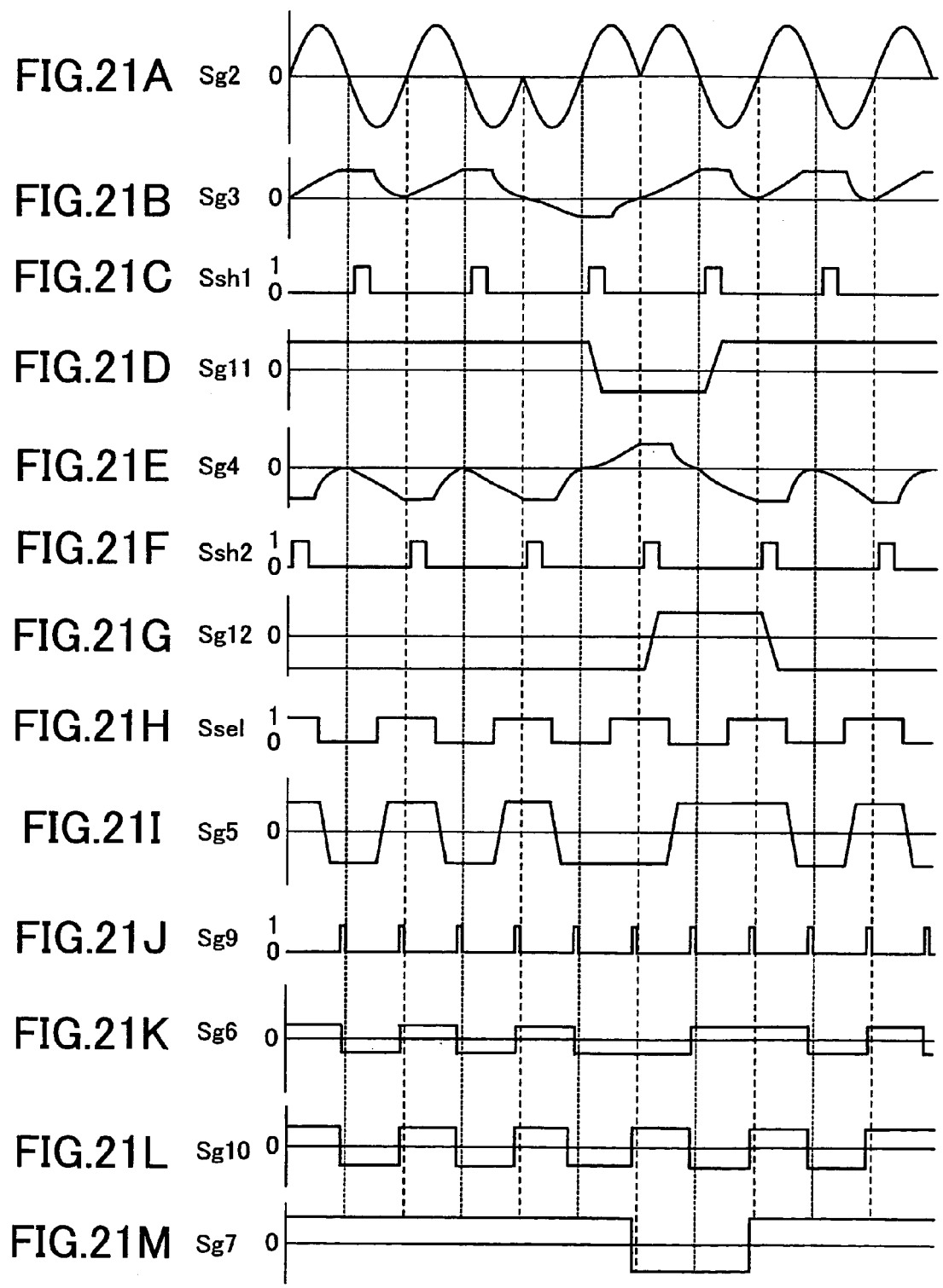

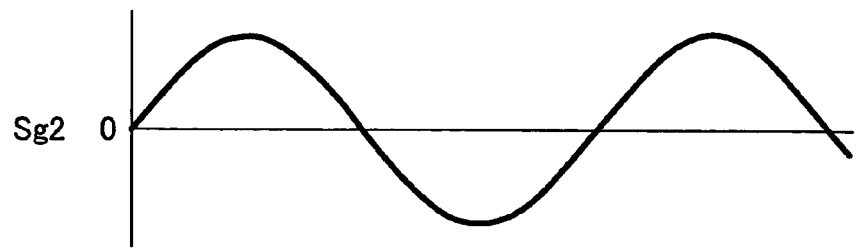
FIG.22A  Sg2
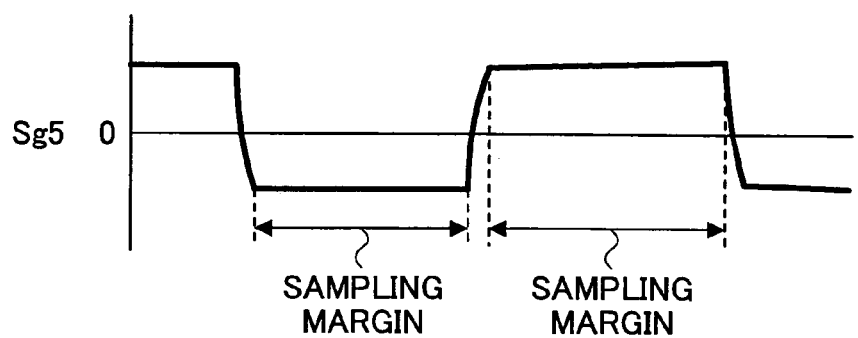
FIG.22B  Sg5
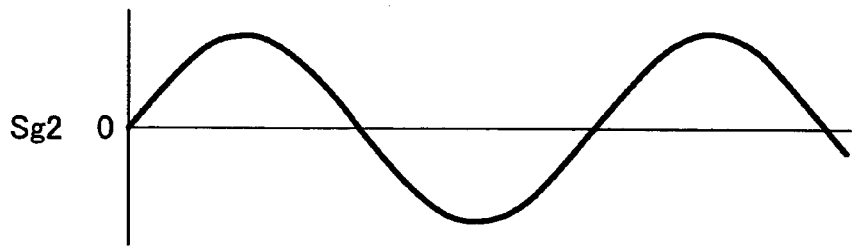
FIG.22C  Sg2
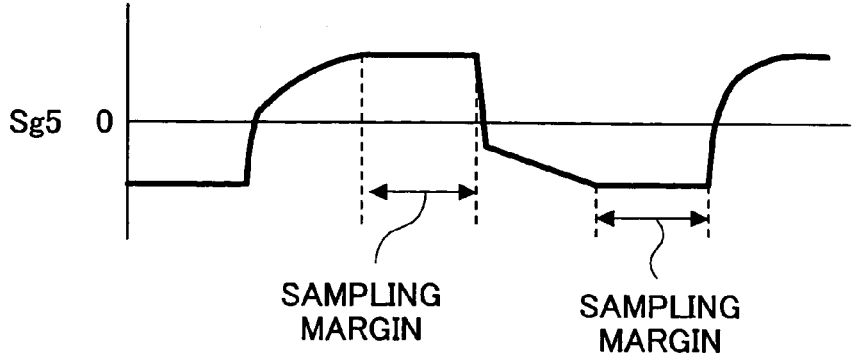
FIG.22D  Sg5

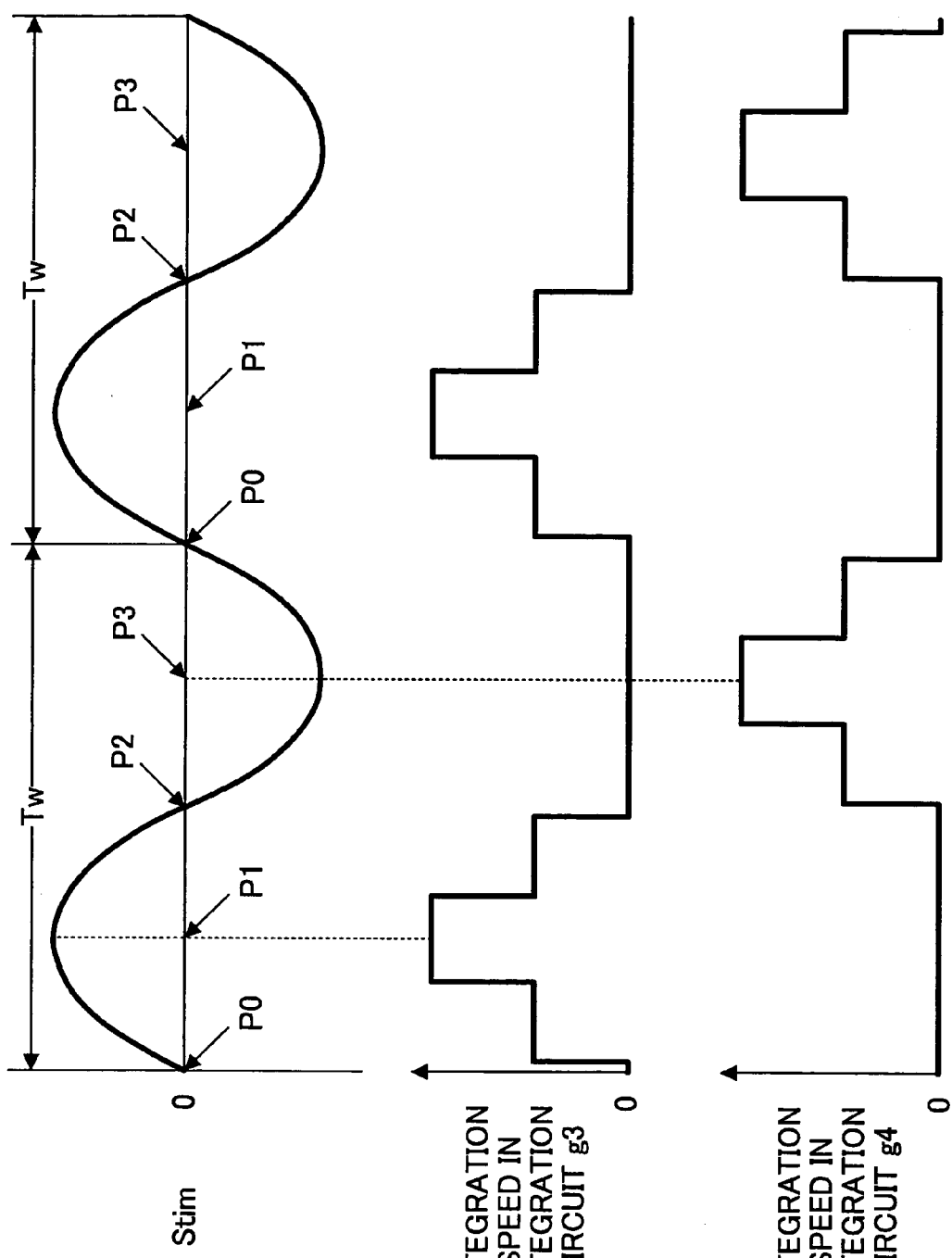

WOBBLING SIGNAL DEMODULATION METHOD, WOBBLING SIGNAL DEMODULATION CIRCUIT, AND OPTICAL DISK DRIVE

CROSS-REFERENCE TO RELATED APPLICATION

This application is a U.S. continuation application filed under 35 USC 111(a) claiming benefit under 35 USC 120 and 365(c) of PCT application JP2004/005790, filed on Apr. 22, 2004, which claims priority to Japanese patent application No. 2003-350633, filed in Japan on Oct. 9, 2003. The foregoing applications are hereby incorporated herein by reference.

BACKGROUND OF THE INVENTION

1. Field of the Invention

The present invention relates to a wobbling signal demodulation method, a wobbling signal demodulation circuit, and an optical disk drive; and particularly, a wobbling signal demodulation method and a wobbling signal demodulation circuit for demodulating a wobbling signal obtained based on light reflected from a recording surface of an optical disk, and an optical disk drive having the wobbling signal demodulation circuit.

2. Description of the Related Art

Along with progress in digital technology and data compression technology, optical disks, such as a CD (Compact Disk) and a DVD (Digital Versatile Disk), which has the same diameter as the CD but a capacity seven times larger as that of the CD, are attracting attention as media for recording data of music, movies, photos, computer software, and other user data. In addition, because of the lowered price of the optical disks, an optical disk drive equipped with such an optical disk is widely used.

Generally, wobbling tracks are formed on a recording surface of a write-once optical disk, such as a CD-R (CD-recordable), a DVD-R (DVD-recordable), and a DVD+R (DVD+recordable), or a rewritable optical disk, such as a CD-RW (CD-rewritable), a DVD-RW (DVD-rewritable), and a DVD+RW (DVD+rewritable). The wobbling tracks include portions modulated according to a specified modulation scheme, and information is included in the modulated portions (reference can be made to Japanese Laid-Open Patent Application No. 10-69646). For example, in a DVD+R or a DVD+RW (below, simply abbreviated to be "DVD"), address information is included in the modulated portions by means of phase modulation.

In an optical disk drive supporting a DVD+R or a DVD+RW, when recording user data in the optical disk, a light beam from a light source is emitted on the recording surface of the DVD+R or the DVD+RW and the incident light is reflected at the recording surface; a wobbling signal, which corresponds to the wobbling shape of the tracks, is detected from the light beam reflected on the tracks, and a clock signal is generated from the wobbling signal; then the wobbling signal is demodulated in synchronization with the clock signal, thereby the address information is obtained. Then, the recording position is controlled based on the obtained address information and the clock signal.

Optical disk drives having circuits capable of phase demodulation on the wobbling signal have been proposed, for example, in Japanese Laid-Open Patent Application No. 2002-74660, Japanese Laid-Open Patent Application No. 2002-124043, Japanese Laid-Open Patent Application No. 2003-157537, Japanese Laid-Open Patent Application No. 2003-203356, Japanese Laid-Open Patent Application No. 9-297969, and others.

Recently and continuing, in order to reduce the size of the optical disk drive, it is attempted to integrate circuits including the phase demodulation circuit into one chip (LSI) to increase the degree of integration of the circuits.

In the LSI, a digital part for processing digital signals and an analog part for processing analog signals are separated formed, and the phase demodulation circuit is in the digital part. In this circuit, the wobbling signal, which is an analog signal, is converted into a digital signal in an analog-digital (AD) converter, and is then provided to the phase demodulation circuit. For example, assume the number of times of sampling in one period of the wobbling signal in the AD converter is 16, and if the optical disk rotates at a one-time speed, the period of the wobbling signal is 1.22 μm, and the wobbling signal is sampled once every 75 ns in the AD converter.

Along with the spreading use of the optical disks, it is required to increase the recording speed on the optical disks. However, if the recording speed is further increased, for example, if the optical disk rotates at a 16-times speed, the period of the wobbling signal becomes 76.5 ms, and the wobbling signal is sampled once every 4.78 ns in the AD converter. In order to meet this requirement, a fast AD converter is needed and this causes an increased cost.

SUMMARY OF THE INVENTION

It is a general object of the present invention to solve one or more problems of the related art.

A first specific object of the present invention is to provide a wobbling signal demodulation method and a wobbling signal demodulation circuit capable of fast and precisely demodulating a wobbling signal obtained based on light reflected from a recording surface of an optical disk without increasing cost of the circuit.

A second specific object of the present invention is to provide an optical disk drive capable of recording on the optical disk at a high speed without increasing the cost.

According to a first aspect of the present invention, there is provided a wobbling signal demodulation method for demodulating a wobbling signal obtained based on light reflected from a recording surface of an optical disk having a wobbling track formed thereon. The wobbling signal includes a carrier portion having a predetermined basic period and a phase demodulated wave portion including predetermined information. The wobbling signal demodulation method includes a first step of respectively integrating a portion of the wobbling signal corresponding to a first half of the basic period and a portion of the wobbling signal corresponding to a second half of the basic period in synchronization with a clock signal generated from the carrier portion; a second step of generating a digital signal based on at least one digital value related to a first integration result corresponding to the first half of the basic period and at least one digital value related to a second integration result corresponding to the second half of the basic period; and a third step of performing a phase demodulation on the phase demodulated wave portion of the wobbling signal based on the digital signal and the clock signal.

According to the present invention, the wobbling signal obtained based on light reflected from a recording surface of an optical disk is integrated in synchronization with a clock signal generated from the carrier portion, specifically, a portion of the wobbling signal corresponding to a first half of the basic period and a portion of the wobbling signal corresponding to a second half of the basic period are respectively integrated, and a digital signal is generated based on at least one digital value related to a first integration result corresponding to the first half of the basic period and at least one digital value related to a second integration result corresponding to the second half of the basic period. Then, a phase demodulation is performed on the phase demodulated wave portion of the wobbling signal based on the digital signal and the clock signal.

Because in the second step, sampling can be performed twice in each wobbling period to generate the digital signal, it is possible to greatly reduce the number of times of sampling when converting an analog signal to a digital signal. Therefore, it is possible to perform precise modulation of the wobbling signal during high-speed recording even when the common devices in the related art are used. That is, it is possible to at high speed and precisely demodulate the wobbling signal obtained based on light reflected from the optical disk without increasing cost of the circuit.

According to a second aspect of the present invention, there is provided a wobbling signal demodulation circuit for demodulating a wobbling signal obtained based on light reflected from a recording surface of an optical disk having a wobbling track formed thereon. The wobbling signal includes a carrier portion having a predetermined basic period and a phase demodulated wave portion including predetermined information. The wobbling signal demodulation circuit includes an integration signal generation circuit that respectively integrates a portion of the wobbling signal corresponding to a first half of the basic period and a portion of the wobbling signal corresponding to a second half of the basic period in synchronization with a clock signal generated from the carrier portion, and generates an integration signal including information of a first integration result corresponding to the first half of the basic period and information of a second integration result corresponding to the second half of the basic period; a digital signal generation circuit that generates a digital signal based on at least one digital value corresponding to the first integration result and at least one digital value corresponding to the second integration result; and a phase demodulation circuit that performs a phase demodulation on the phase demodulated wave portion of the wobbling signal based on the digital signal and the clock signal.

According to the above invention, the wobbling signal obtained based on light reflected from a recording surface of an optical disk is integrated by the integration signal generation circuit in synchronization with a clock signal generated from the carrier portion, specifically, a portion of the wobbling signal corresponding to a first half of the basic period and a portion of the wobbling signal corresponding to a second half of the basic period are respectively integrated, and an integration signal is generated that includes information of a first integration result corresponding to the first half of the basic period and information of a second integration result corresponding to the second half of the basic period. A digital signal is generated by the digital signal generation circuit based on at least one digital value related to a first integration result corresponding to the first half of the basic period and at least one digital value related to a second integration result corresponding to the second half of the basic period. Phase demodulation is performed by the phase demodulation circuit on the phase-demodulated wave portion of the wobbling signal based on the digital signal and the clock signal.

Because in the integration signal generation circuit, sampling can be performed twice in each wobbling period to generate the digital signal, it is possible to greatly reduce the number of times of sampling when converting an analog signal to a digital signal. Therefore, it is possible to perform precise modulation of the wobbling signal in high speed recording even when the common devices in the related art are used. That is, it is possible to quickly and precisely demodulate the wobbling signal obtained based on light reflected from the optical disk without increasing cost of the circuit.

According to a third aspect of the present invention, there is provided an optical disk drive for performing at least one of operations of recording, reproducing, and erasing data in an optical disk having a wobbling track formed thereon. The optical disk drive includes a wobbling signal demodulation circuit that demodulates a wobbling signal obtained based on light reflected from a recording surface of the optical disk, and a data recording unit that determines a recording position based on position information of the wobbling track and records data in the optical disk. The wobbling signal includes a carrier portion having a predetermined basic period and a phase demodulated wave portion including predetermined information. The position information is obtained from an output signal from the wobbling signal demodulation circuit. The wobbling signal demodulation circuit includes an integration signal generation circuit that respectively integrates a portion of the wobbling signal corresponding to a first half of the basic period and a portion of the wobbling signal corresponding to a second half of the basic period in synchronization with a clock signal generated from the carrier portion, and generates an integration signal including information of a first integration result corresponding to the first half of the basic period and information of a second integration result corresponding to the second half of the basic period; a digital signal generation circuit that generates a digital signal based on at least one digital value corresponding to the first integration result and at least one digital value corresponding to the second integration result; and a phase demodulation circuit that performs a phase demodulation on the phase demodulated wave portion of the wobbling signal based on the digital signal and the clock signal.

These and other objects, features, and advantages of the present invention will become more apparent from the following detailed description of preferred embodiments given with reference to the accompanying drawings.

BRIEF DESCRIPTION OF THE DRAWINGS

FIG. 6 is a table showing data bits represented by the ADIP information areas;

FIG. 10 is a diagram showing a configuration of an I/V amplifier 28a;

FIGS. 15A through 15M are timing charts for explaining operations of a reproduction signal processing circuit 28;

FIGS. 20A through 20F are timing charts for explaining the sample and hold signals Ssh1 and Ssh2 in the demodulation signal generation circuit 28g;

FIGS. 21A through 21M are timing charts for explaining operations of the demodulation signal generation circuit 28g;

FIGS. 22A through 22D are waveforms for explaining the effects of the sample-and-hold circuits g11 and g12; and FIGS. 23A through 23C are timing charts for explaining adjustment of the integration speed.

DESCRIPTION OF THE PREFERRED EMBODIMENTS

Below, preferred embodiments of the present invention are explained with reference to the accompanying drawings.

Figure 1:
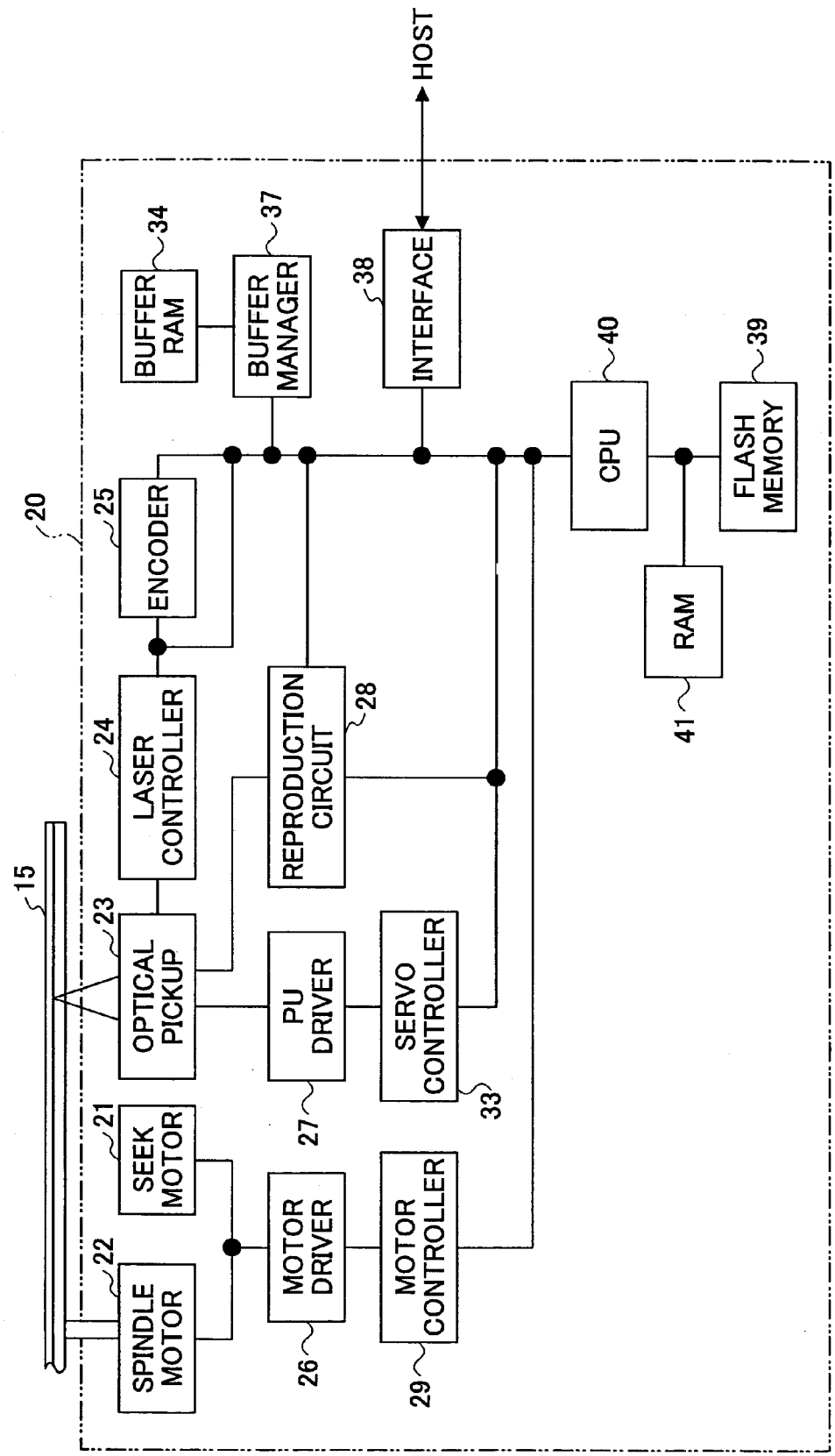
FIG. 1 is a block diagram schematically showing a configuration of an optical disk drive 20 according to an embodiment of the present invention.

FIG. 1 is a block diagram schematically showing a configuration of an optical disk drive 20 according to an embodiment of the present invention.

The optical disk drive 20 illustrated in FIG. 1 includes a seek motor 21, a spindle motor 22, an optical pickup 23, a laser controller 24, an encoder 25, a motor driver 26, a PU driver 27, a reproduction signal processing circuit 28, a motor controller 29, a servo controller 33, a buffer RAM 34, a buffer manager 37, an interface 38, a flash memory 39, a CPU 40, and a RAM 41.

In FIG. 1, the connection lines between the above elements just indicate the chief connection relation of them for typical signals and data, but do not indicate all connection relations in the optical disk drive 20.

As illustrated in FIG. 1, the optical disk drive 20 records or reproduces data in an optical disk 15. In this embodiment, as an example, it is assumed that the optical disk 15 is an optical recording medium in conformity with the DVD+R standard.

On the recording surface of the optical disk 15, spiral guiding grooves (denoted as "G") are formed. Generally, when viewing the recording surface of an optical disk along the incident direction of a laser beam, projecting portions are the grooves G, depressed portions are referred to as "lands" (denoted as "L"). The grooves L are the tracks for recording information.

Figure 2:
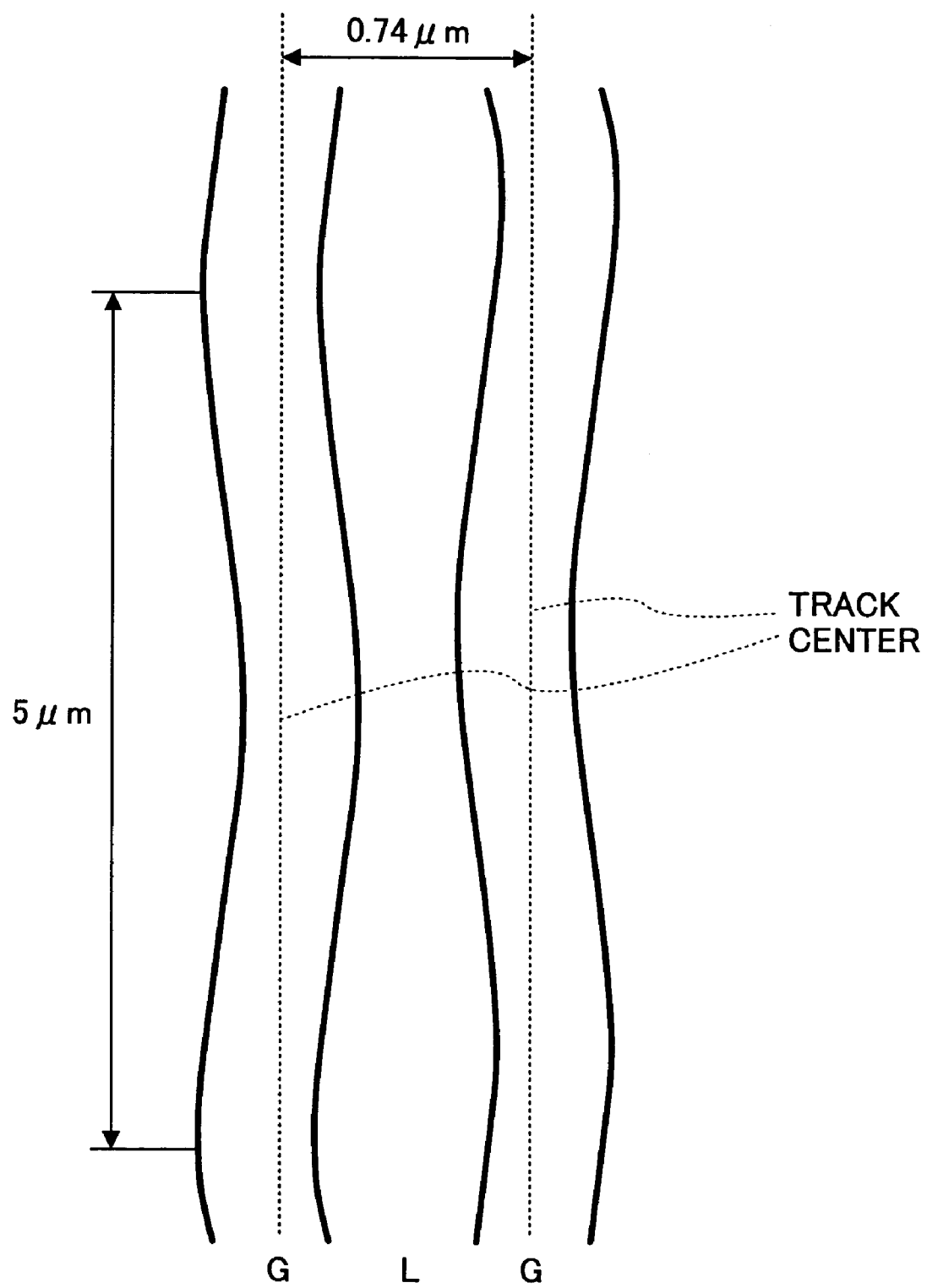
FIG. 2 is a schematic view of the wobbling tracks on an optical disk.

FIG. 2 is a schematic view of the grooves G. As illustrated in FIG. 2, the grooves G are in wobbling shapes.

According to the DVD+R standard, the wobbling shape is determined by an ADIP (ADdress In Pregroove) unit and a carrier. The ADIP unit includes various kinds of information. The carrier is used to generate a reference clock signal used for recording, and a timing clock signal used for phase demodulation. In the present embodiment, the basic element formed from the carrier and the ADIP unit is called an "information frame", and the part of the information frame related to the carrier is called a "carrier part of the information frame".

Figure 3:
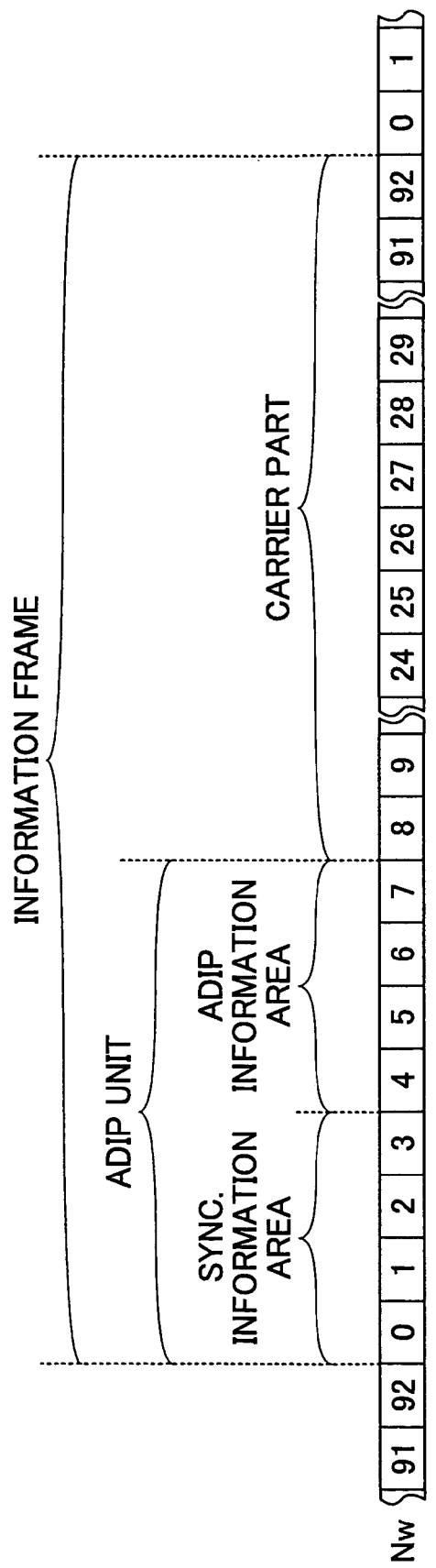
FIG. 3 is a data diagram for schematically illustrating a configuration of an information frame.

FIG. 3 is a view for schematically illustrating a configuration of the information frame.

If a period of the carrier (a basic period, referred to as "wobbling period", below) is one wobble, the size of the information frame illustrated in FIG. 3 is 93 wobbles, and the wobble number Nw=0 to 92. The wobbles having the wobble numbers of Nw=0 to 7 correspond to the ADIP unit, which is the phase modulated wave part, and the wobbles having the wobble numbers of Nw=8 to 92 correspond to form the carrier part.

A data zone of the ADIP unit, in which data are recorded, includes a synchronization information area recorded with synchronization information and an ADIP information area recorded with address information. In the information frame illustrated in FIG. 3, the synchronization information area corresponds to wobbles of Nw=0 to 3, and the ADIP information area corresponds to wobbles of Nw=4 to 7. In other words, the size of the synchronization information area is four wobbles, and the size of the ADIP information area is also four wobbles. The synchronization information area and the ADIP information area are modulated according to, for example, PSK (Phase Shift Keying) modulation.

Figure 4A:
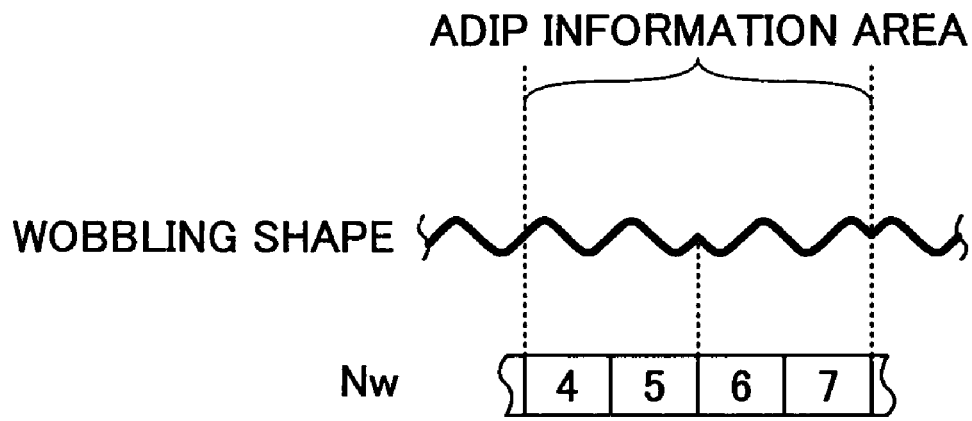
FIG. 4A and FIG. 4B are schematic views showing wobbling states of an ADIP information area.
Figure 4B:
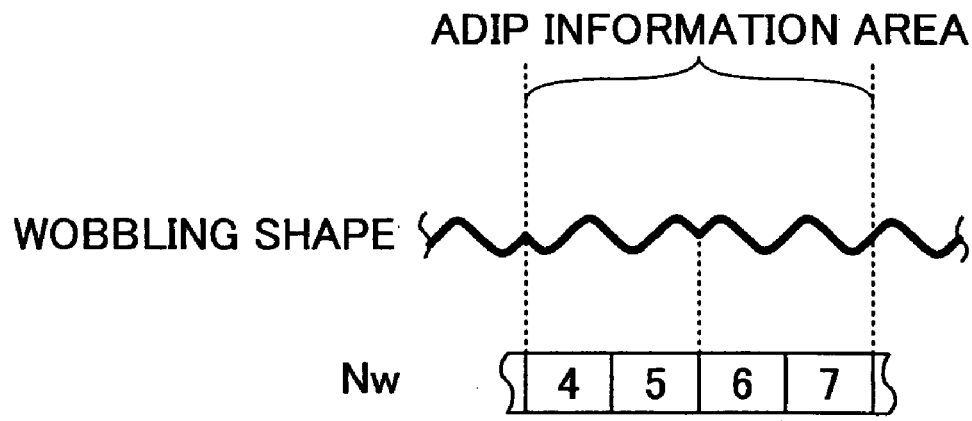

FIG. 4A and FIG. 4B are schematic views showing wobbling states of the ADIP information area.

The four wobbles of the ADIP information area represent one bit. When the value of the ADIP information area is zero, as illustrated in FIG. 4A, phases of the leading two wobbles are set to be the same as that of the carrier, and phases of the following two wobbles are set to be opposite to that of the carrier.

When the value of the ADIP information area is one, as illustrated in FIG. 4B, the phases of the leading two wobbles are set to be opposite to that of the carrier, and the phases of the following two wobbles are set to be the same as the carrier. Note that data of 51 bits are necessary in order to obtain address data.

Figure 5A:
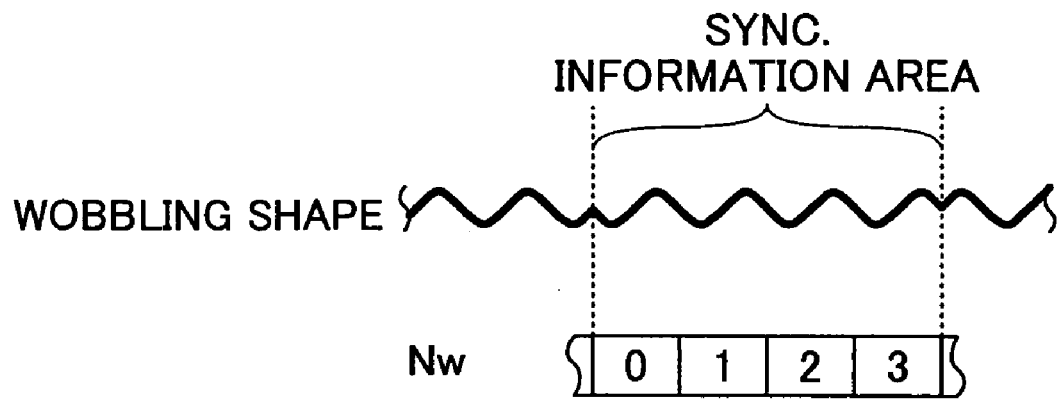
FIG. 5A and FIG. 5B are schematic views showing wobbling states of a synchronization information area.
Figure 5B:
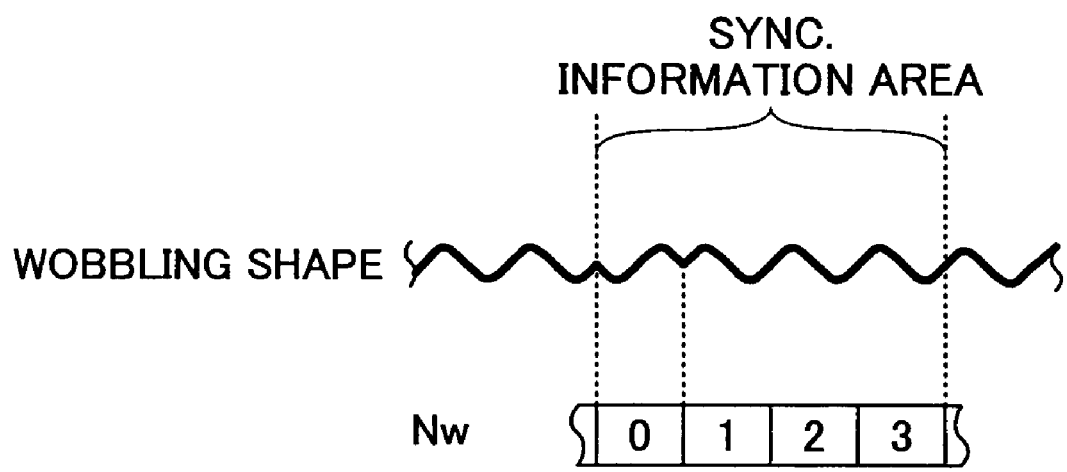

FIG. 5A and FIG. 5B are schematic views showing wobbling states of the synchronization information area.

When the value of the first ADIP information area of the following information frames is set to be one, the synchronization information area forms word synchronization (word sync) information, specifically, the phases of all the four wobbles are set to be opposite to that of the carrier, as illustrated in FIG. 5A. When the value of the ADIP information area is set to be one, the synchronization information area forms bit synchronization (bit sync) information, specifically, the phase of the first wobble is set to be opposite to that of the carrier, and the phases of the following three wobbles are set to be the same as that of the carrier, as illustrated in FIG. 5B.

FIG. 6 is a table showing the data bits represented by the ADIP information areas. As illustrated in FIG. 6, one address data element is obtained from 52 information frames.

Figure 7:
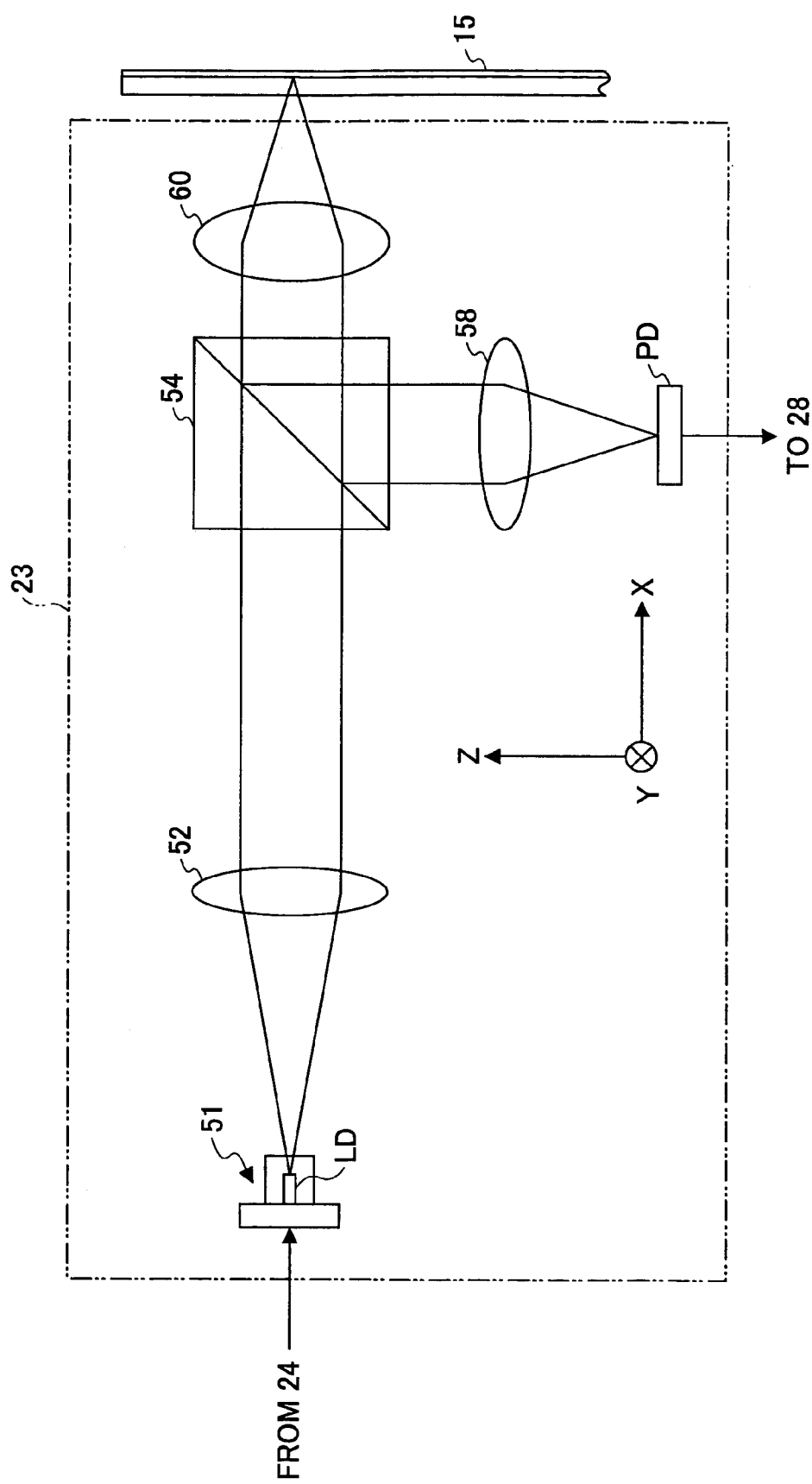
FIG. 7 is a schematic diagram showing an example of a configuration of an optical pickup 23.

The aforesaid seek motor 21 drives the optical pickup 23 to move in a storage direction, that is, along the Z axis shown in FIG. 7. The aforesaid spindle motor 22 drives the optical disk 15 to rotate.

The optical pickup 23 emits a laser beam onto a recording surface of the optical disk 15 on which the tracks are formed, and simultaneously receives light reflected on the recording surface.

FIG. 7 is a diagram showing an example of a configuration of the optical pickup 23.

As illustrated in FIG. 7, the optical pickup 23 includes a light source unit 51, a collimator lens 52, a beam splitter 54, an object lens 60, a detection lens 58, a photo detector PD, and a driving system including a not-illustrated focusing actuator and a not-illustrated tracking actuator.

For example, the light source unit 51 includes a semiconductor laser LD that emits a laser beam having a wavelength of 660 nm. In the present embodiment, the maximum strength of the laser beam from the light source unit 51 is along the X axis shown in FIG. 7.

The collimator lens 52 is arranged on the +X side of the light source unit 51 to convert the laser beam from the light source unit 51 to a parallel light beam.

The beam splitter 54 is arranged on the +X side of the collimator lens 52 to allow the incident parallel light beam from the collimator lens 52 to pass through. In addition, the beam splitter 54 directs a light beam coming from the object lens 60, that is, a returning light beam (RB) reflected on the recording surface of the optical disk 15, to the −Z direction.

The object lens 60 is arranged on the +X side of the beam splitter 54 to condense the light beam from the beam splitter 54 onto the recording surface of the optical disk 15.

The detection lens 58 is arranged on the −Z side of the beam splitter 54 to condense the light beam directed to the −Z direction by the beam splitter 54 onto the detection surface of the photo detector PD.

Figure 8:
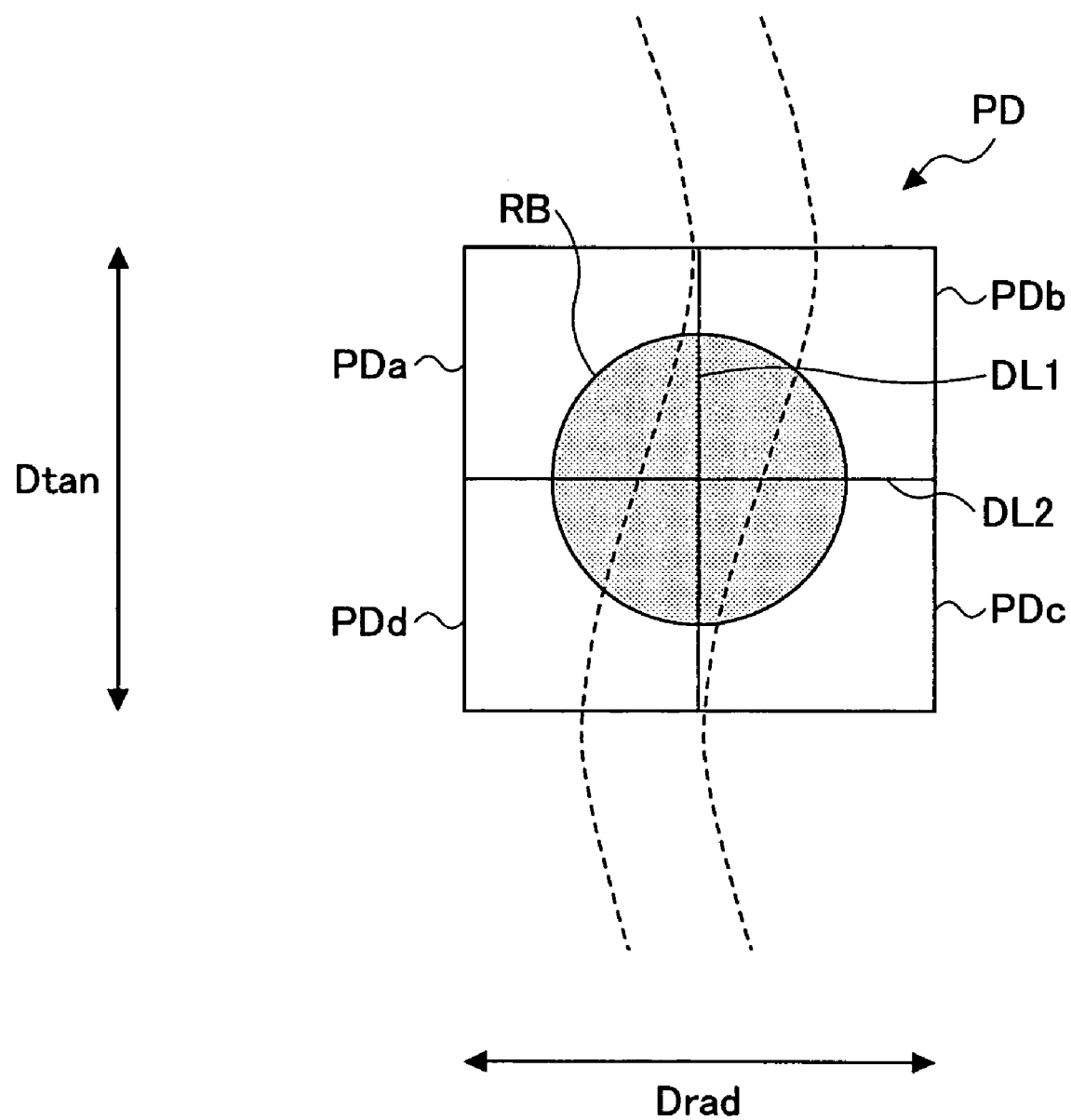
FIG. 8 is a schematic view for explaining a photo detector PD.

FIG. 8 is a schematic view for explaining the photo detector PD.

As illustrated in FIG. 8, the detection surface of the photo detector PD is divided by a line DL1 along a tangential direction Dtan (the vertical direction in FIG. 8) of the tracks (indicated by dashed lines in FIG. 8), and by a line DL2 along a Drad (the direction perpendicular to the tangential direction Dtan of the tracks in FIG. 8). That is, the detection surface of the photo detector PD is divided into four divisions PDa, PDb, PDc, and PDd. The division PDa is on the left side of the division line DL1 and the upper side of the division line DL2 in FIG. 8. The division PDb is on the right side of the division line DL1 and the upper side of the division line DL2 in FIG. 8. The division PDc is on the right side of the division line DL1 and the lower side of the division line DL2 in FIG. 8. The division PDd is on the left side of the division line DL1 and the lower side of the division line DL2 in FIG. 8.

Each of the divisions PDa, PDb, PDc, and PDd outputs signals corresponding to the amount of the received light to the reproduction signal processing circuit 28.

The photo detector PD is arranged so that the returning light RB is detected substantially at the center of the photo detector PD.

The not-illustrated focusing actuator drives the object lens 60 to slightly move in a focusing direction (X direction in FIG. 8), which is the optical direction of the object lens 60.

The not-illustrated tracking actuator drives the object lens 60 to slightly move in a tracking direction (Z direction in FIG. 8), which is perpendicular to the tangential direction of the tracks.

Figure 9:
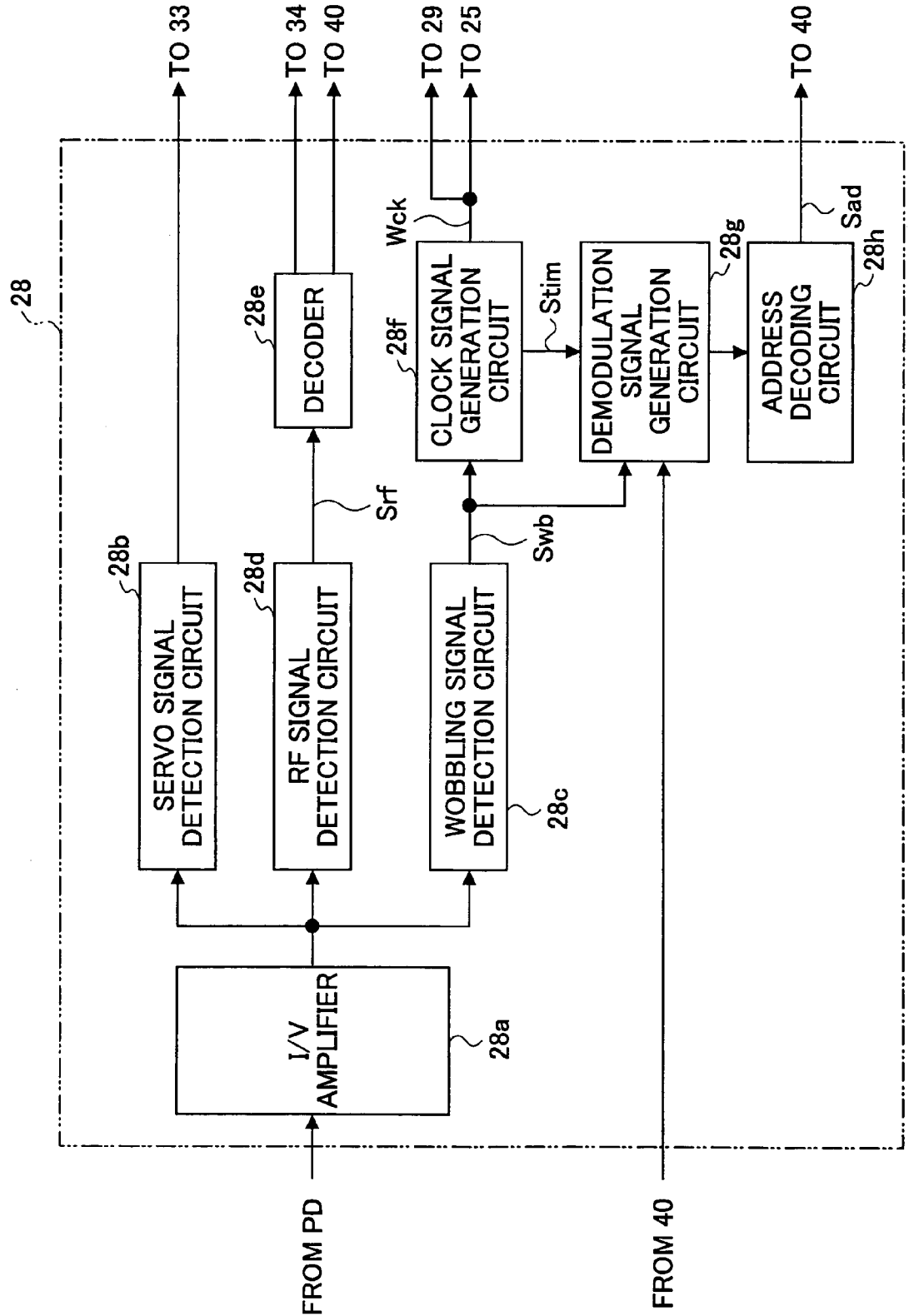
FIG. 9 is a schematic view for explaining a reproduction signal processing circuit 28.

FIG. 9 is a schematic view for explaining the reproduction signal processing circuit 28.

As illustrated in FIG. 9, the reproduction signal processing circuit 28 includes an I/V amplifier 28a, a servo signal detection circuit 28b, a wobbling signal detection circuit 28c, a RF signal detection circuit 28d, a decoder 28e, a clock signal generation circuit 28f, a demodulation signal generation circuit 28g, which functions as the wobbling signal demodulation circuit of the present invention, and a address decoding circuit 28h. In FIG. 9, the arrows just indicate flows of typical signals and data, but not the complete connection relations in the reproduction signal processing circuit 28.

The I/V amplifier 28a converts a current signal from the photo detector PD into a voltage signal, and increases the amplitude of the voltage signal.

Figure 10:
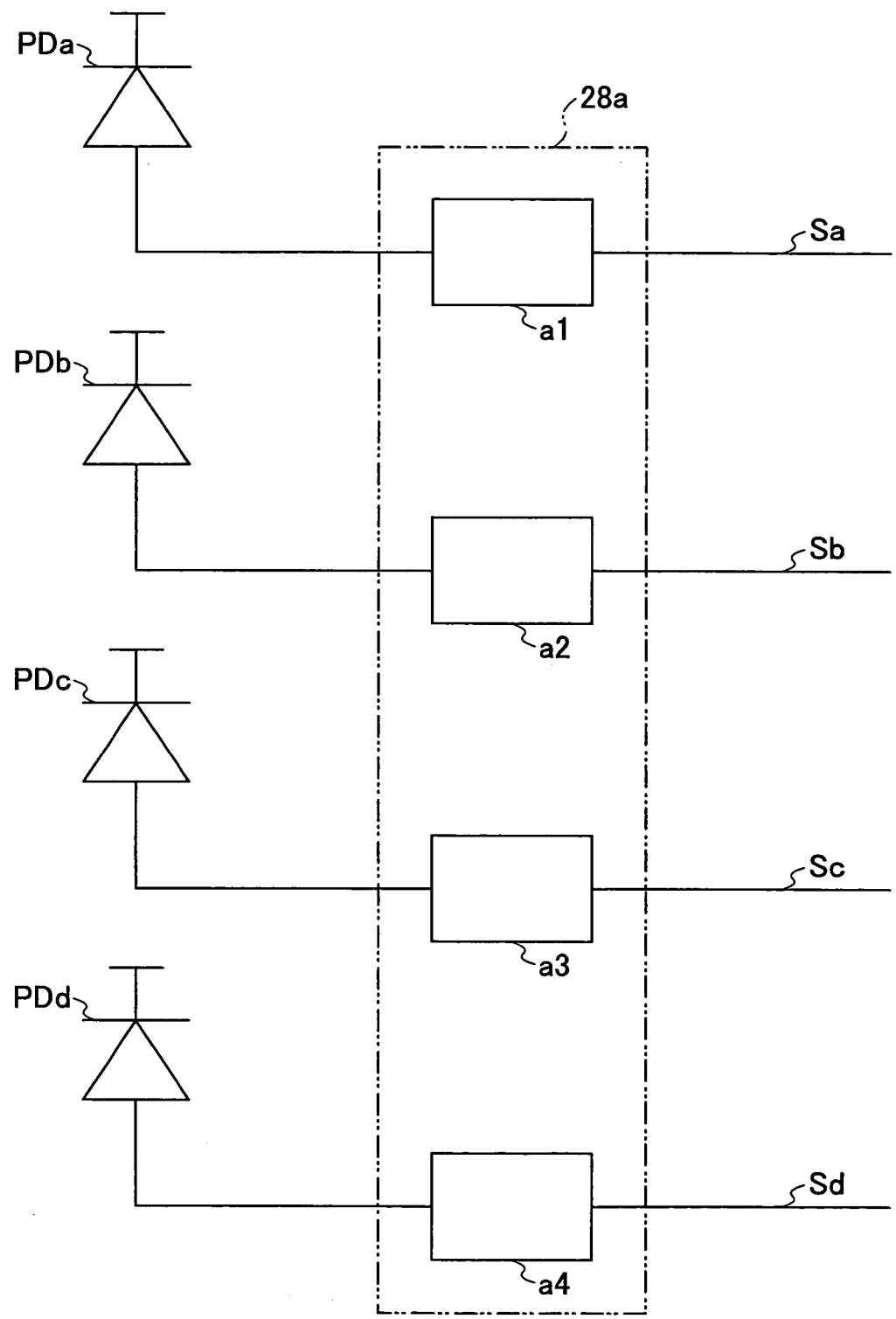

FIG. 10 is a diagram showing a configuration of the I/V amplifier 28a.

As illustrated in FIG. 10, the I/V amplifier 28a includes an amplifier a1 for converting a current signal from the division PDa of the photo detector PD into a voltage signal Sa and amplifying the voltage signal Sa, an amplifier a2 for converting a current signal from the division PDb of the photo detector PD into a voltage signals Sb and amplifying the voltage signal Sb, an amplifier a3 for converting a current signal from the division PDc of the photo detector PD into a voltage signal Sc and amplifying the voltage signal Sc, and an amplifier a4 for converting a current signal from the division PDd of the photo detector PD into a voltage signal Sd and amplifying the voltage signals Sd. The voltage signal Sc corresponds to the first photoelectrical conversion signal, and the voltage signal Sd corresponds to the second photoelectrical conversion signal.

Returning to FIG. 9, the servo signal detection circuit 28b detects servo signals, such as a focus error signal and a track error signal, based on the output signals from the I/V amplifier 28a. The focus error signal is obtained from a difference between a summation of the signals Sa and Sb and a summation of the signals Sc and Sd. The track error signal is obtained from a difference between a summation of the signals Sa and Sd and a summation of the signals Sb and Sc.

The obtained servo signals are output to the servo controller 33.

The RF signal detection circuit 28d detects a RF signal (Srf) based on the output signals from the I/V amplifier 28a. For example, The RF signal Srf is obtained from a summation of the signals Sa, Sb, Sc and Sd. The track error signal is obtained from a difference between a summation of the signals Sa and Sd and a summation of the signals Sb and Sc.

The obtained RF signal Srf is output to the decoder 28e.

The decoder 28e decodes the RF signal Srf and carries out error detection on the RF signal Srf. If errors are detected, the decoder 28e performs error corrections on the RF signal Srf, and stores the corrected RF signal Srf as reproduction data in the buffer 34 through the buffer manager 37. The RF signal Srf includes address data. The decoder 28e extracts the address data and outputs the address data to the CPU 40.

The wobbling signal detection circuit 28c detects a wobbling signal (Swb) based on the output signals from the I/V amplifier 28a. The obtained wobbling signal Swb is output to the clock signal generation circuit 28f and the demodulation signal generation circuit 28g.

Figure 11:
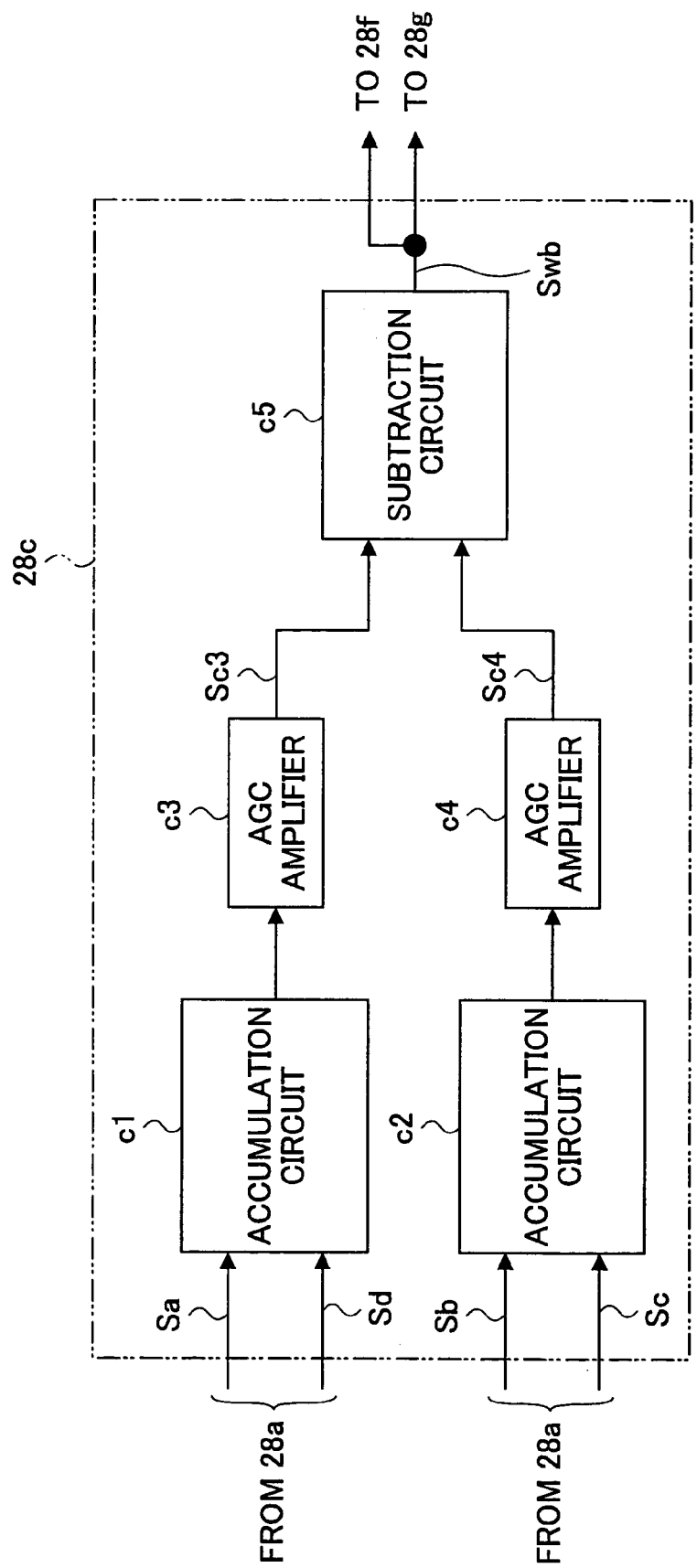
FIG. 11 is a block diagram showing a configuration of a wobbling signal detection circuit 28c.

FIG. 11 is a block diagram showing a configuration of the wobbling signal detection circuit 28c.

As illustrated in FIG. 11, the wobbling signal detection circuit 28c includes two accumulation circuits c1 and c2, two AGC amplifiers c3 and c4, and a subtraction circuit c5.

The accumulation circuit c1 generates a summation signal of the signals Sa and Sd output from the I/V amplifier 28a. The accumulation circuit c2 generates a summation signal of the signals Sb and Sc from the I/V amplifier 28a. The AGC amplifier c3 adjusts a level of the output signal of the accumulation circuit c1, and the AGC amplifier c4 adjusts a level of the output signal of the accumulation circuit c2. Due to the AGC amplifiers c3 and c4, the noise in the signal Sc3 output from the AGC amplifier c3 is at nearly the same level as the noise in the signal Sc4 output from the AGC amplifier c4.

The subtraction circuit c5 generates a difference signal between the signal Sc3 output from the AGC amplifier c3 and the signal Sc4 output from the AGC amplifier c4.

The clock signal generation circuit 28f generates a reference clock signal (Wck) and a timing clock signal based on the wobbling signal Swb.

Figure 12:
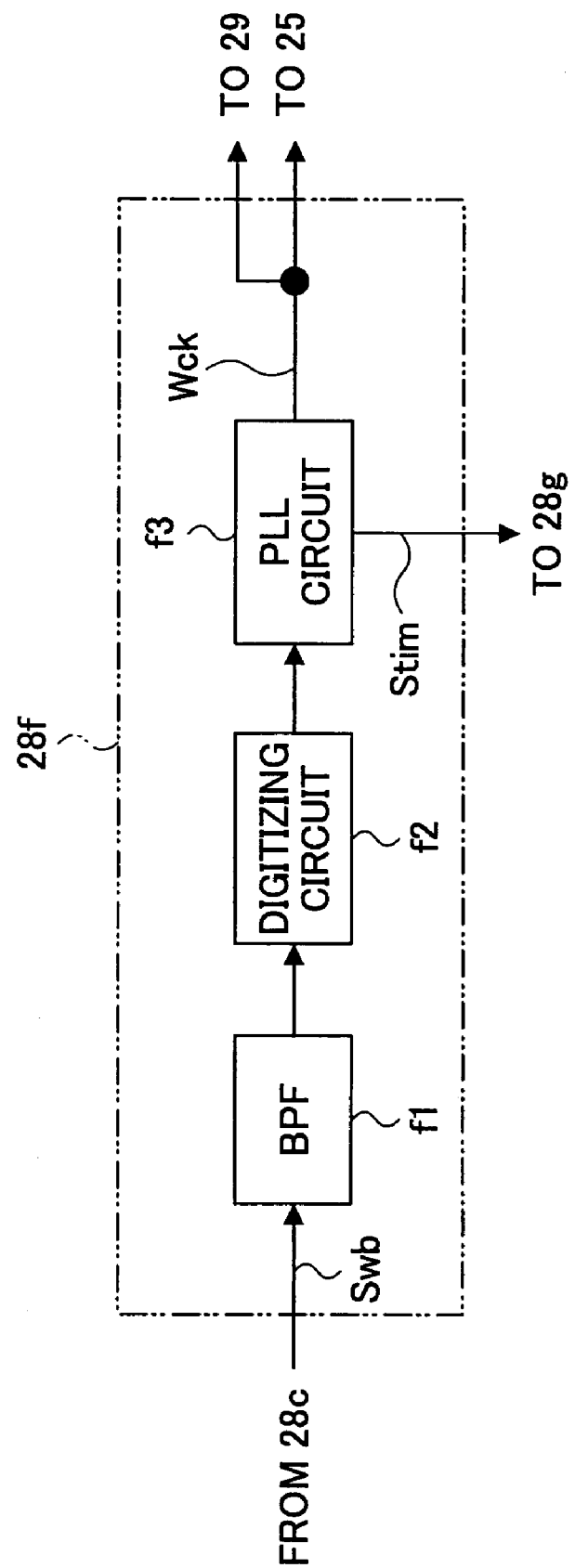
FIG. 12 is a block diagram showing a configuration of a clock signal generation circuit 28f.

FIG. 12 is a block diagram showing a configuration of the clock signal generation circuit 28f.

As illustrated in FIG. 12, the clock signal generation circuit 28f includes a band-pass filter (BPF) f1, a digitizing circuit f2, and a PLL (Phase Locked Loop) circuit f3. The band-pass filter (BPF) f1 extracts the carrier from the wobbling signal Swb. The digitizing circuit f2 converts the signal output from the band-pass filter (BPF) f1 into a binary signal. The PLL (Phase Locked Loop) circuit f3 generates the reference clock signal (Wck) and the timing clock signal in synchronization with the signal output from the digitizing circuit f2. The thus obtained reference clock signal (Wck) is output to the encoder 25 and the motor controller 29, and the thus obtained timing clock signal Stim is output to the demodulation signal generation circuit 28g. The period of the reference clock signal Wck is 1/32 of the period Tw of the carrier, and the period of the timing clock signal Stim is the same as the period Tw of the carrier.

The demodulation signal generation circuit 28g demodulates the wobbling signal Swb based on the timing clock signal Stim from the clock signal generation circuit 28f, and generates a demodulated signal. The demodulated signal is output to the address decoding circuit 28h.

Figure 13:
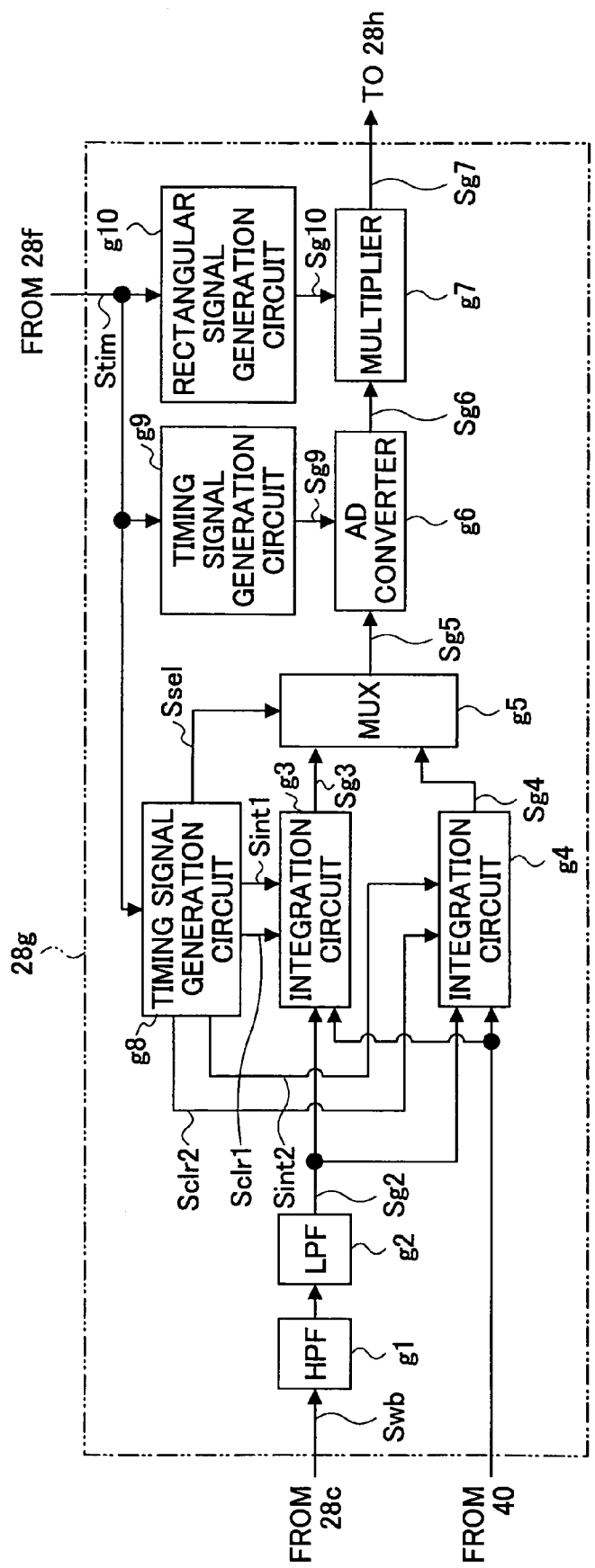
FIG. 13 is a block diagram showing a configuration of a demodulation signal generation circuit 28g.

FIG. 13 is a block diagram showing a configuration of the demodulation signal generation circuit 28g.

As illustrated in FIG. 13, the demodulation signal generation circuit 28g includes a high-pass filter (HPF) g1, a low-pass filter (LPF) g2, two integration circuits g3 and g4, a multiplexer (MUX) g5, an AD converter g6, a multiplier g7, two timing signal generation circuit g8 and g9, and a rectangular signal generation circuit g10.

The high-pass filter (HPF) g1 reduces the low frequency noise composition in the wobbling signal Swb. The low frequency noise is mainly generated by servo shifts in focus control and tracking control, a fluctuation of the substrate thickness of the optical disk, the cross talk from an adjacent track, and others.

The low-pass filter (LPF) g2 reduces the high frequency noise composition in the signal output from the high-pass filter (HPF) g1. Accordingly, the signal Sg2 output from the low-pass filter (LPF) g2 is reduced in both the high frequency noise composition and the low frequency noise composition (refer to FIG. 14).

The high frequency noise is mainly caused by superposition of the RF signal, variation of the power of the light beam from the light source unit 51, and due to noise generated in the circuit and noise generated in the semiconductor laser LD.

The timing signal generation circuit g8 generates an integration timing signal Sint1, a reset signal Sclr1, an integration timing signal Sint2, a reset signal Sclr2, and a selection signal Ssel based on the timing clock signal Stim.

FIGS. 14A through 14E are timing charts for explaining the relation of the integration timing signal Sint1, the integration timing signal Sint2, the reset signal Sclr1, and the reset signal Sclr2.

Figure 14A:
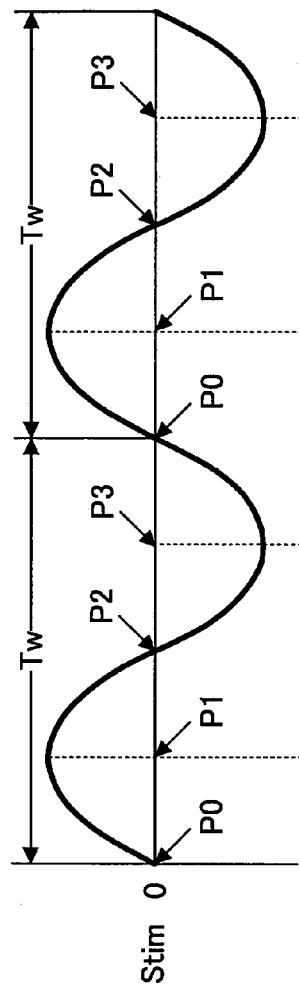
FIGS. 14A through 14E are timing charts for explaining the relation of an integration timing signal Sint1, an integration timing signal Sint2, a reset signal Sclr1, and a reset signal Sclr2.

As illustrated in FIG. 14A, the phase corresponding to a start of a wobbling period in the timing clock signal Stim is represented by P0, the phase later than P0 by a quarter of the wobbling period of the timing clock signal Stim is represented by P1, the phase later than P1 by a quarter of the wobbling period of the timing clock signal Stim is represented by P2, and the phase later than P2 by a quarter of the wobbling period of the timing clock signal Stim is represented by P3.

Figure 14B:
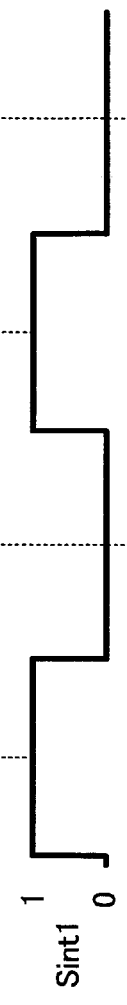

The integration timing signal Sint1 notifies the integration circuit g3 of the timing of integration. As illustrated in FIG. 14B, the integration timing signal Sint1 is a pulsed signal, varying from a low level (zero) to a high level (one) at a timing near the phase P0, and from the high level (one) to the low level (zero) at a timing near the phase P2. In addition, the centers of the pulses in the integration timing signal Sint1 essentially correspond to the phase P1. The pulse width of the integration timing signal Sint1 is about (Tw/2)×0.7. The integration timing signal Sint1 illustrated in FIG. 14B is output to the integration circuit g3.

Figure 14C:
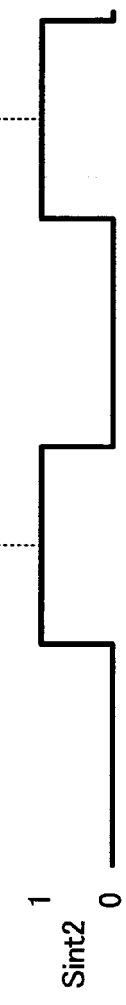
Figure 14D:
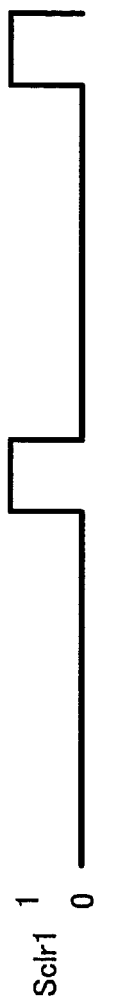

The reset signal Sclr1 directs the resetting of the integration circuit g3. As illustrated in FIG. 14D, the reset signal Sclr1 is a pulsed signal, varying from zero to one and from one to zero between the phase P3 and the next phase P0. Considering variation of sampling timing in the AD converter g6, it is preferable that the pulses of the reset signal Sclr1 be close to the phase P0 as much as possible. The reset signal Sclr1 illustrated in FIG. 14D is output to the integration circuit g3.

The integration timing signal Sint2 notifies the integration circuit g4 of the timing of integration. As illustrated in FIG. 14C, the integration timing signal Sint2 is a pulsed signal, varying from zero to one at a timing near the phase P2, and from one to zero at a timing near the phase P0. In addition, the centers of the pulses in the integration timing signal Sint2 essentially correspond to the phase P3. The pulse width of the integration timing signal Sint2 is about (Tw/2)×0.7. The integration timing signal Sint2 illustrated in FIG. 14C is output to the integration circuit g4.

Figure 14E:

The reset signal Sclr2 instructs the resetting of the integration circuit g4. As illustrated in FIG. 14E, the reset signal Sclr2 is a pulsed signal, varying from zero to one and from one to zero between the phase P1 and the next phase P2. Considering variation of the sampling timing in the AD converter g6, it is preferable that the pulses of the reset signal Sclr2 be close to the phase P2 as much as possible. The reset signal Sclr2 illustrated in FIG. 14E is output to the integration circuit g4.

The selection signal Ssel selects one of an output signal Sg3 from the integration circuit g3 and an output signal Sg4 from the integration circuit g4 as an output signal of the multiplexer g5.

FIGS. 15A through 15M are timing charts for explaining operations of the reproduction signal processing circuit 28.

As illustrated in FIG. 15H, the selection signal Ssel changes from zero to one when the reset signal Sclr2 changes from zero to one, and changes from one to zero when the reset signal Sclr1 changes from zero to one. The selection signal Ssel illustrated in FIG. 15H is output to the multiplexer g5.

In synchronization with the integration timing signal Sint1, the integration circuit g3 integrates a portion of the signal Sg2 output from the low pass filter g2 corresponding to the first half (P0 to P2) of the wobbling period, as shown in FIG. 15D. The signal S3 from the integration circuit g3 is output to the multiplexer g5. In the present embodiment, it is set that the integration circuit g3 starts integration at the rising time of the integration timing signal Sint1, and stops integration at the falling time of the integration timing signal Sint1.

Figure 16:
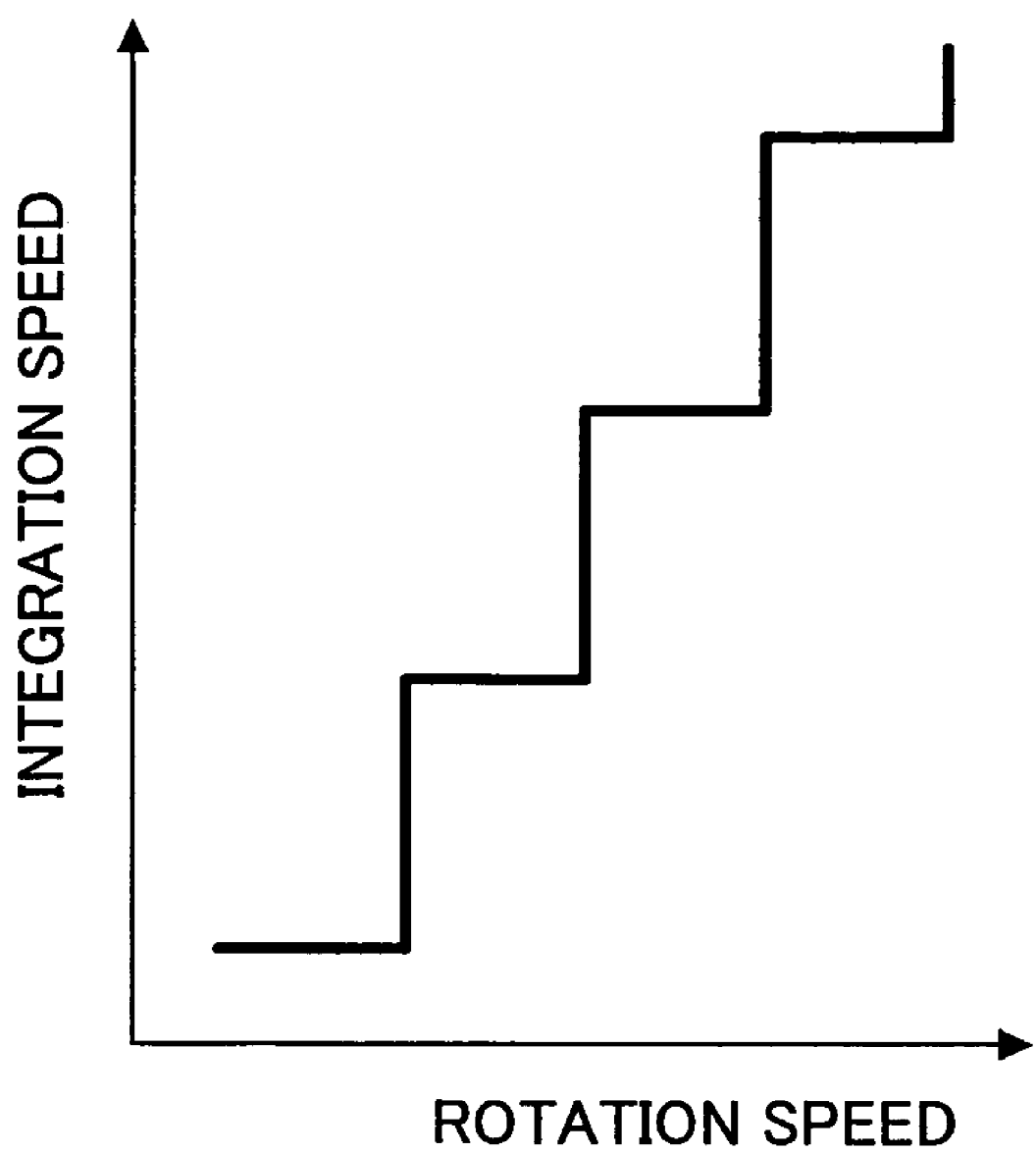
FIG. 16 is a graph showing an example of a relation between the rotational speed of the optical disk 15 and an integration speed of the integration circuit g3.

FIG. 16 is a graph showing an example of a relation between the rotational speed of the optical disk and an integration speed of the integration circuit g3.

As illustrated in FIG. 16, the integration speed (that is, processing speed) of the integration circuit g3 is set by the CPU 40 according to the rotational speed of the optical disk 15. Specifically, a setting value of the integration speed is set in a specified register of the integration circuit g3. In addition, it is set that the integration circuit g3 resets the integration value in synchronization with the rising time of the reset signal Sclr1.

Further, in synchronization with the integration timing signal Sint2, the integration circuit g4 integrates a portion of the signal Sg2 output from the low pass filter g2 corresponding to the second half (P2 to P0) of the wobbling period, as shown in FIG. 15G. The signal S4 from the integration circuit g4 is output to the multiplexer g5. In the present embodiment, it is set that the integration circuit g4 starts integration at the rising time of the integration timing signal Sint4, and stops integration at the falling time of the integration timing signal Sint2.

Similar to the integration circuit g3, the integration speed (that is, processing speed) of the integration circuit g4 is set by the CPU 40 according to the rotational speed of the optical disk 15. Specifically, a setting value of the integration speed is set in a specified register of the integration circuit g4. In addition, it is set that the integration circuit g4 resets the integration value in synchronization with the rising time of the reset signal Sclr2.

Accordingly, the integration circuit g3 and the integration circuit g4 perform the same integration operation with the phase shifted by half of a period.

The multiplexer (MUX) g5 selects one of the signal Sg3 from the integration circuit g3 and the signal Sg4 from the integration circuit g4, and outputs the selected signal as a signal Sg5 to the AD converter g6, as shown in FIG. 15I. For example, it is set that the multiplexer (MUX) g5 selects the signal Sg3 from the integration circuit g3 when the selection signal Ssel equals 1, and selects the signal Sg4 from the integration circuit g4 when the selection signal Ssel equals 0.

Based on the timing clock signal Stim from the clock signal generation circuit 28f, the timing signal generation circuit g9 generates a sampling signal Sg9 to direct the AD converter g6 to sample the wobbling signal Swb. The sampling signal Sg9 is a pulsed signal, varying from zero to one and from one to zero between the falling time of the integration timing signal Sint1 and the rising time of the reset signal Sclr1, and between the falling time of the integration timing signal Sint2 and the rising time of the reset signal Sclr2. The thus generated timing signal generation circuit g9 is output to the AD converter g6.

Based on the sampling signal Sg9, the AD converter g6 samples the signal Sg5 from the multiplexer (MUX) g5, and converts the analog signal Sg5 into a digital signal Sg6. The digital signal Sg6 is output to the multiplier g7. As an example, it is set that the AD converter g6 samples the signal Sg5 in synchronization with the rising time of the sampling signal Sg9. Specifically, the AD converter g6 samples the signal Sg5 twice every wobbling period (one for the signal Sg3 from the integration circuit g3, and one for the signal Sg4 from the integration circuit g4). Therefore, if the optical disk 15 rotates at a 16-times speed, the AD converter g6 samples the signal Sg5 once every 38.25 ns.

Based on the timing clock signal Stim from the clock signal generation circuit 28f, the rectangular signal generation circuit g10 generates a rectangular signal Sg10 having the same period as the timing clock signal Stim, as shown in FIG. 15L. The thus generated signal Sg10 is output to the multiplier g7.

The multiplier g7 generates a multiplication signal of the digital signal Sg6 from the AD converter g6 and the rectangular signal Sg10. As shown in FIG. 15M, the output signal Sg7 from the multiplier g7 is at a positive level when phases of the digital signal Sg6 and the rectangular signal Sg10 are the same, and the output signal Sg7 from the multiplier g7 is at a negative level when phases of the digital signal Sg6 and the rectangular signal Sg10 are opposite.

The signal Sg7 from the multiplier g7 is output to the address decoding circuit 28h as a demodulation signal Sg7.

Returning to FIG. 9, the address decoding circuit 28h monitors the demodulation signal Sg7 to detect signals corresponding to the synchronization information area (referred to as "synchronization information signal"). When the address decoding circuit 28h finds the synchronization information signal in the demodulation signal Sg7, the address decoding circuit 28h extracts signals in the demodulation signal Sg7 corresponding to the ADIP information area (referred to as "ADIP information signal"). When the number of bits of the ADIP information signal extracted by the address decoding circuit 28h reaches a predetermined value, for example, 51 bits in the present embodiment, the address decoding circuit 28h decodes the ADIP information signals to obtain the address data. The thus obtained address data are output to CPU 40 as an address signal Sad.

Returning to FIG. 1, the servo controller 33 generates a focus control signal for correcting a focus shift based on the focus error signal from the servo signal detection circuit 28b, and generates a tracking control signal for correcting a track shift based on the track error signal from the servo signal detection circuit 28b. These control signals are output to the motor driver 26 with servo-on, and are not output with servo-off. The servo-on and servo-off states are set by the CPU 40.

The PU driver 27 outputs a driving signal for the focusing actuator corresponding to the focus control signal to the optical pickup 23, and a driving signal for the tracking actuator corresponding to the tracking control signal to the optical pickup 23. That is, the tracking control and the focus control are performed by the servo signal detection circuit 28b, the servo controller 33 and the PU driver 27.

The motor controller 29 generates a rotational control signal for controlling the rotation of the spindle motor 22, and generates a seek control signal for controlling the seek operation of the seek motor 21. In addition, the motor controller 29 adjusts the rotational control signal based on the reference clock signal Wck and the FG signal described below. These control signals are output to the motor driver 26.

The motor driver 26 outputs a driving signal corresponding to the rotational control signal to the spindle motor 22, and outputs a driving signal corresponding to the seek control signal to the seek motor 21. The motor driver 26 outputs a pulsed signal having a period corresponding to the rotational period of the spindle motor 22 to the motor controller 29. This pulsed signal is referred to as an FG signal.

The buffer RAM 34 has a buffer area for temporarily storing data to be recorded in the optical disk 15 (recording data) or data to be reproduced from the optical disk 15 (reproduction data), and a variable area for storing various program variables.

The buffer manager 37 manages input and output of data in and from the buffer RAM 34, and sends a notification to the CPU 40 when the amount of data stored in the buffer area of the buffer RAM 34 reaches a predetermined value.

Based on instructions from CPU 40, the encoder 25 extracts the recording data stored in the buffer RAM 34 through the buffer manager 37, adds data modulation codes and error correction codes, and generates a write signal for writing data in the optical disk 15. The thus generated write signal is output to the laser controller 24 together with the reference clock signal Wck. For example, the encoder 25, the reproduction signal processing circuit 28, the buffer manager 37, and the interface 38 are integrated into one LSI.

The laser controller 24 controls power of the laser beam emitted onto the optical disk 15. For example, when recording data in the optical disk 15, the laser controller 24 generates a driving signal for the semiconductor laser LD according to the recording conditions, the light emission features of the semiconductor laser LD, the write signal from the encoder 25 and the reference clock signal Wck.

The interface 38 is a communication interface for bi-directional communication with a host computer, for example, a personal computer. The interface 38 may be in conformity with the ATAPI (AT Attachment Packet Interface) standard.

The flash memory 39 has a program area and a data area. The program area stores programs including codes readable by the CPU 40, and the data area stores information on recording conditions and light emission features of the semiconductor laser LD, and information on seek operations of the optical pickup 23 (abbreviated to be "seek information").

The CPU 40 controls operations of all the above elements according to the programs stored in the program area of the flash memory 39, and stores data necessary to control in the variable area of the buffer RAM 34 and the RAM 41.

Below, with reference to FIG. 17, an explanation is given to the recording operation of the optical disk drive 20 upon receiving a command from a host for recording data.

Figure 17:
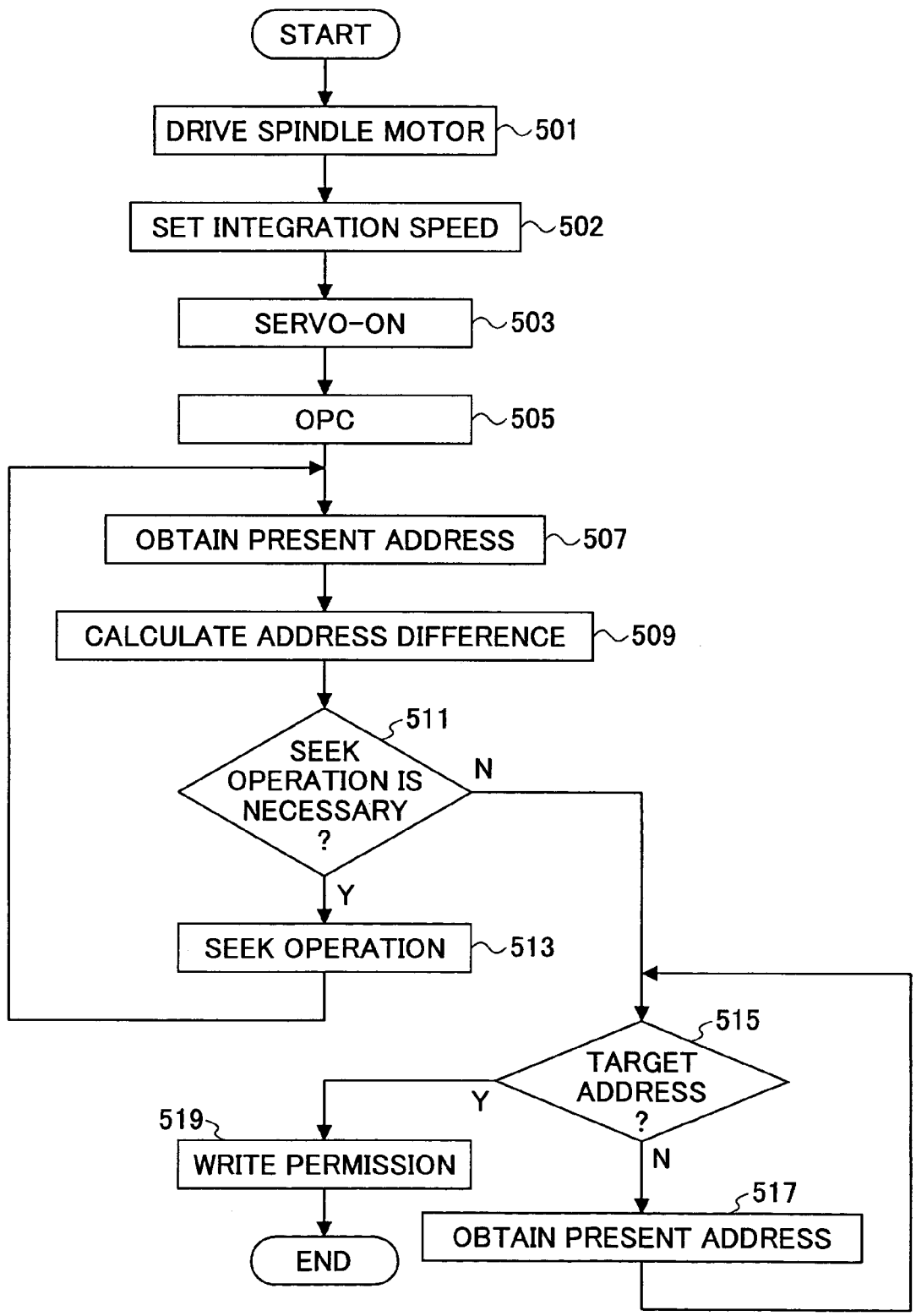
FIG. 17 is a flowchart showing the recording operation of the optical disk drive 20 upon receiving a recording request from a host.

FIG. 17 is a flowchart showing the recording operation of the optical disk drive 20 upon receiving a recording request from a host.

The recording operation shown in FIG. 17 corresponds to a series of algorithms carried out by the CPU 40. When receiving a recording request from the host, the starting address of a program corresponding to the flowchart in FIG. 17 is set in a program counter of the CPU 40, and the recording operation starts.

In step 501, the CPU 40 directs the motor controller 29 to drive the spindle motor 22 to rotate at a speed corresponding to a predetermined recording speed, and notifies the reproduction signal processing circuit 28 that a recording request is received from the host. In addition, the CPU 40 directs the buffer manager 37 to store the recording data received from the host in the buffer RAM 34.

In step 502, the CPU 40 determines the integration speeds of the respective integration circuits based on the rotational speed of the optical disk 15, and sets setting values of the integration speeds in specified registers (not illustrated) of the integration circuits, respectively. Thereby, the demodulation signal generation circuit 28g demodulates the wobbling signal, and the obtained address signal Sad is constantly output to the address decoding circuit 28h via the CPU 40.

In step 503, once the CPU 40 determines that optical disk 15 is rotating at a predetermined linear speed, the CPU 40 sets servo-on in the servo controller 33. Thereby, the tracking control and the focus control are carried out. The tracking control and the focus control are performed as needed before the recording operation is ended.

In step 505, OPC (Optimum Power Control) is performed based on the recording speed to obtain the optimum recording power. That is, predetermined data are recorded in trial write area, usually called "PCA: Power Calibration Area", while the recording power is being adjusted step-by-step, then the trial-recorded data are reproduced in order, and for example, when an asymmetric value detected from the RF signal is in agreement with a target value obtained by measurement in advance, the recording quality is regarded to be the maximum quality, and the corresponding recording power is regarded to be the optimum recording power.

In step 507, the CPU 40 obtains the present address from the address signal Sad output from the address decoding circuit 28h.

In step 509, the CPU 40 calculates the difference (address difference) between the present address and the target address extracted from the recording request.

In step 511, based on the address difference, the CPU 40 determines whether a seek operation is necessary. For example, as the seek information, the CPU 40 makes reference to a threshold value stored in the flash memory 39, and if the address difference exceeds the threshold value, the answer of the determination in this step is Yes, that is, the seek operation is necessary, and the routine proceeds to step 513.

In step 513, the CPU 40 directs the motor controller 29 to drive the seek motor 21. Thereby, the seek motor 21 moves to perform the seek operation to reduce the address difference. Then, the routine returns to step 507.

Then, steps 507 through 513 are repeated until the address difference is smaller than the threshold value. In the above step 511, if the CPU 40 determines the address difference is smaller than the threshold value, the answer of the determination in step 511 is No, that is, the seek operation is necessary, and the routine proceeds to step 515.

In step 515, the CPU 40 determines whether the present address is in agreement with the target address. If the present address is not in agreement with the target address, the answer of the determination in step 515 is No, and the routine proceeds to step 517.

In step 517, the CPU 40 obtains the present address from the address signal Sad output from the address decoding circuit 28h. Then, the routine returns to step 515.

Then, steps 515 and 517 are repeated until the answer of the determination in step 515 becomes Yes.

If the present address is in agreement with the target address, the answer of the determination in step 515 is Yes, and the routine proceeds to step 519.

In step 519, the CPU 40 issues write permission to the encoder 25. Thereby, the recording data are written in the optical disk 15 via the encoder 25, the laser controller 24, and the optical pickup 23.

After the recording data are completely recorded, the recording operation is finished following appropriate ending operations.

Below, with reference to FIG. 18, an explanation is given to the reproduction operation of the optical disk drive 20 upon receiving a reproduction request from the host.

Figure 18:
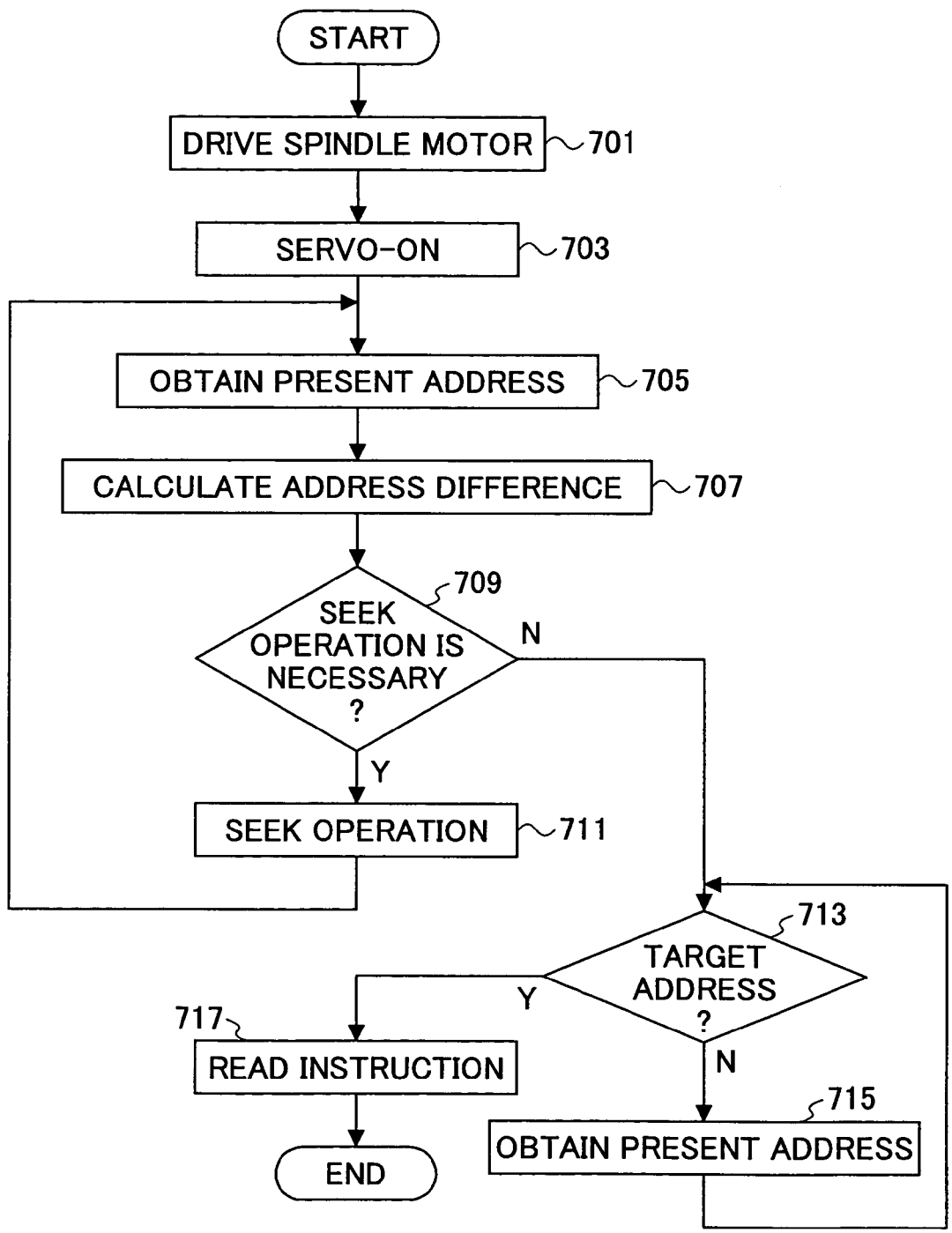
FIG. 18 is a flowchart showing the reproduction operation of the optical disk drive 20 upon receiving a reproduction request from the host.

FIG. 18 is a flowchart showing the reproduction operation of the optical disk drive 20 upon receiving a reproduction request from the host.

The recording operation shown in FIG. 17 corresponds to a series of algorithms carried out by the CPU 40. When receiving a reproduction request from the host, the starting address of a program corresponding to the flowchart in FIG. 17 is set in a program counter of the CPU 40, and the reproduction operation starts.

In step 701, the CPU 40 directs the motor controller 29 to drive the spindle motor 22 to rotate at a speed corresponding to a predetermined reproduction speed, and notifies the reproduction signal processing circuit 28 that a reproduction request is received from the host.

In step 703, once the CPU 40 determines that optical disk 15 rotates at a predetermined linear speed, the CPU 40 sets servo-on in the servo controller 33. Thereby, the tracking control and the focus control are carried out. The tracking control and the focus control are performed as needed before the reproduction operation is ended.

In step 705, the CPU 40 obtains the present address from the address data from the decoder 28e.

In step 707, the CPU 40 calculates the difference (address difference) between the present address and the target address extracted from the reproduction request command.

In step 709, based on the address difference, the CPU 40 determines whether a seek operation is necessary. For example, if the address difference exceeds the threshold value stored in the flash memory 39, the answer of the determination in this step is Yes, that is, the seek operation is necessary, and the routine proceeds to step 713.

In step 711, the CPU 40 directs the motor controller 29 to drive the seek motor 21. Thereby, the seek motor 21 moves to perform the seek operation to reduce the address difference. Then, the routine returns to step 705.

Then, steps 705 through 711 are repeated until the address difference is smaller than the threshold value. In the above step 709, if the CPU 40 determines the address difference is smaller than the threshold value, the answer of the determination in step 709 is No, that is, the seek operation is not necessary, and the routine proceeds to step 713.

In step 713, the CPU 40 determines whether the present address is in agreement with the target address. If the present address is not in agreement with the target address, the answer of the determination in step 713 is No, and the routine proceeds to step 715.

In step 715, the CPU 40 obtains the present address from the address data from the decoder 28e. Then, the routine returns to step 713.

Then steps 713 and 715 are repeated until the answer of the determination in step 713 becomes Yes.

If the present address is in agreement with the target address, the answer of the determination in step 713 is Yes, and the routine proceeds to step 717.

In step 717, the CPU 40 directs the reproduction signal processing circuit 28 to read data. Thereby, the reproduction signal processing circuit 28 obtains the reproduction data from the optical disk 15 and stores the reproduction data in the buffer RAM 34. The reproduction data are transmitted to the host in units of sectors via the buffer manager 37 and the interface 38.

After host reproduces all of the reproduction data, the reproduction operation is finished following appropriate ending operations.

As described above, in the optical disk drive 20 of the present embodiment, the optical pickup 23, the CPU 40, and the programs executed by the CPU 40 correspond to the data recording unit of the present invention. The CPU 40 and the programs executed by the CPU 40 correspond to the integration speed setting unit of the present invention.

The invention is not limited to these embodiments. The above specific embodiments are chosen just for purpose of illustration. For example, the units realized by programs executed by the CPU 40 may also be formed or partially formed by hardware.

The demodulation signal generation circuit 28g corresponds to the wobbling signal demodulation circuit of the present invention. Specifically, The timing signal generation circuit g8, the integration circuits g3 and g4, and the multiplexer (MUX) g5 corresponds to the integration signal generation circuit of the present invention, the timing signal generation circuit g9, and the AD converter g6 corresponds to the digital signal generation circuit of the present invention, the rectangular signal generation circuit g10 and the multiplier g7 corresponds to the phase demodulation circuit of the present invention.

The operation of the demodulation signal generation circuit 28g corresponds to the wobbling signal demodulation method of the present invention.

Therefore, as described above, the wobbling signal Swb obtained based on light reflected from the recording surface of the optical disk 15 is integrated after the low frequency noise composition in the wobbling signal Swb is reduced by the high-pass filter (HPF) g1, and the high frequency noise composition in the wobbling signal Swb is reduced by the low-pass filter (LPF) g2. Specifically, a portion of the wobbling signal Swb corresponding to a first half of the basic period is integrated by the integration circuits g3 in synchronization with the integration timing signal Sint1, and a portion of the wobbling signal Swb corresponding to a second half of the basic period is integrated by the integration circuits g4 in synchronization with the integration timing signal Sint2.

In the multiplexer g5, and the signal Sg5 is generated that includes information of a first integration result corresponding to the first half of the basic period and information of a second integration result corresponding to the second half of the basic period.

In the AD converter S6, a digital signal Sg6 is generated based on at least one digital value related to a first integration result corresponding to the first half of the basic period and at least one digital value related to a second integration result corresponding to the second half of the basic period. The first integration result and the second integration result are included in the signal Sg5. The multiplier g7 generates a multiplication signal of the digital signal Sg6 from the AD converter g6 and the rectangular signal Sg10. The signal Sg7 from the multiplier g7 is output as the demodulation signal Sg7.

In the AD converter g6, sampling can be performed twice in each wobbling period to generate the digital signal, and it is possible to greatly reduce the number of times of sampling when converting an analog signal to a digital signal. Therefore, it is possible to perform precise modulation of the wobbling signal in high speed recording even when the common AD converter in the related art is used. That is, it is possible to fast and precisely demodulate the wobbling signal obtained based on light reflected from the optical disk without increasing the cost of the circuit.

In the present embodiment, because the integration speeds are specified according to the rotation speed of the optical disk 15, it is possible to increase the wobbling composition in the signal Sg5 output from the multiplexer g5. Thereby, it is possible to increase the accuracy of wobbling signal demodulation.

In the present embodiment, because precise phase demodulation is performed on the wobbling signal in the demodulation signal generation circuit 28g, it is possible to obtain the address information at high precision in the address decoding circuit 28h. Therefore, it is possible to precisely determine the recording position, and consequently, it is possible to perform recording with high quality at a high speed.

Figure 19:
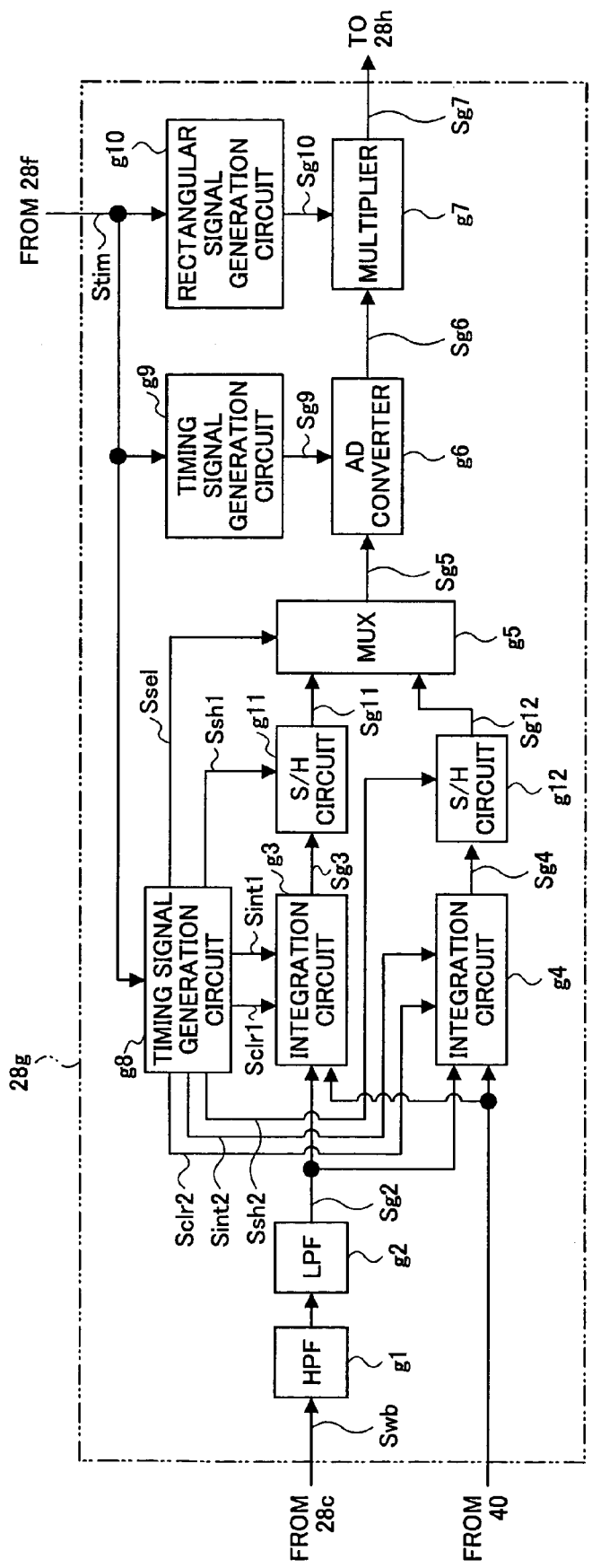
FIG. 19 is block diagram showing a configuration of the demodulation signal generation circuit 28g with additional sample-and-hold circuits.

FIG. 19 is block diagram showing a configuration of the demodulation signal generation circuit 28g with additional sample-and-hold circuits.

As illustrated in FIG. 19, in the demodulation signal generation circuit 28g, a sample and hold (S/H) circuit g11, as the first sample-and-hold circuit, may be arranged at the output end of the integration circuit g3, and a sample and hold (S/H) circuit g12, as the second sample-and-hold circuit, may be arranged at the output end of the integration circuit g4.

For example, it may be set that the sample and hold (S/H) circuit g11, in synchronization with a sample and hold signal Ssh1, starts sampling immediately after the integration circuit g3 stops integration, and holds the integration value in the integration circuit g3 immediately before the integration value in the integration circuit g3 is cleared.

Similarly, it may be set that the sample and hold (S/H) circuit g12, in synchronization with a sample and hold signal Ssh2, starts sampling immediately after the integration circuit g4 stops integration, and holds the integration value in the integration circuit g4 immediately before the integration value in the integration circuit g4 is cleared. For example, the sample and hold (S/H) circuits g11 and g12 start sampling at the rising time of the sample and hold signal Ssh1 and Ssh2, respectively, and hold the sampling at the falling time of the sample and hold signal Ssh1 and Ssh2.

FIGS. 20A through 20F are timing charts for explaining the sample and hold signals Ssh1 and Ssh2 in the demodulation signal generation circuit 28g.

As illustrated in FIG. 20C and FIG. 20F, the sample and hold signal Ssh1 varies from zero to one at a time immediately after the falling time of the integration timing signal Sint1, and from one to zero at a time immediately before the rising time of the clear signal Sclr1.

Similarly, the sample and hold signal Ssh2 varies from zero to one at a time immediately after the falling time of the integration timing signal Sint2, and from one to zero at a time immediately before the rising time of the clear signal Sclr2.

FIGS. 21A through 21M are timing charts for explaining operations of the demodulation signal generation circuit 28g.

The sample and hold signals Ssh1 and Ssh2 may be generated by the timing signal generation circuit g8 based on the timing clock signal Stim. In this case, the multiplexer g5 selects one of the output signal Sg11 from the sample-and-hold circuit g11 and the output signal Sg12 from the sample-and-hold circuit g12 according to the selection signal Ssel, and outputs the selected signal as the signal Sg5 to the AD converter g6.

Then, similar with the above embodiment, the demodulation signal Sg7 is generated via the AD converter g6 and the multiplier g7.

FIGS. 22A through 22D are waveforms for explaining the effects of the sample-and-hold circuits g11 and g12.

When the sample-and-hold circuits g11 and g12 are respectively arranged at the output ends of the integration circuits g3 and g4, the output signal Sg5 from the multiplexer g5, as shown in FIG. 22B, has a wider flat portion than the output signal Sg5 (as shown in FIG. 22D) when no sample-and-hold circuit is incorporated, and this results in a larger margin of the sampling timing in the AD converter g6. That is, the tolerable range of deviation of the sampling timing increases.

FIGS. 23A through 23C are timing charts showing an example of adjusting the integration speed.

As illustrated in FIGS. 23A through 23C, the integration speed in the integration circuit g3 may be adjusted to increase near the phase P1, similarly, the integration speed in the integration circuit g4 may be adjusted to increase near the phase P3. Due to this, the wobbling composition in the output signal Sg5 from the multiplexer g5 can be further increased. Specifically, the register value in the integration circuit g3 is modified near the phase P1, and the register value in the integration circuit g4 is modified near the phase P3 by the timing signal generation circuit g8. The CPU 40 may notify the timing signal generation circuit g8 of information of quantity of adjustment and timing of adjustment. That is, the timing signal generation circuit g8 corresponds to the integration speed adjustment circuit.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

In the above embodiments, it is described that the output signal Sg6 from the AD converter g6 is multiplied with the rectangular signal Sg10 in the multiplier g7, but the rectangular signal Sg10 may be replaced by a sine wave signal. In this case, instead of the rectangular signal generation circuit g10, a sine wave signal generation circuit is provided to generate the sine wave signal, which has the same period as the timing clock signal Stim, based on the timing clock signal Stim from the clock signal generation circuit 28f.

In the above embodiments, it is described that sampling is performed twice in each wobbling period, but the present invention is not limited to this, for example, sampling may be performed three times in each wobbling period.

In the above embodiment, it is described that the optical disk 15 is conformity with the DVD+R standard, but the present invention is not limited to this, for example, the optical disk 15 may also be conformity with the DVD+RW standard.

In the above embodiments, it is described that the optical disk drive 20 is capable of recording and reproduction, but the present invention is not limited to this, for example, the optical disk drive 20 may be capable of at least one of the operations of recording, reproduction, and erasing.

In the above embodiments, it is described that the optical pickup 23 includes one semiconductor laser, but the present invention is not limited to this, for example, the optical pickup 23 may include multiple semiconductor lasers emitting laser beams of different wavelengths. For example, the optical pickup 23 may include at least one of a semiconductor laser emitting a laser beam of a wavelength of 405 nm, a semiconductor laser emitting a laser beam of a wavelength of 660 nm, and a semiconductor laser emitting a laser beam of a wavelength of 780 nm. That is, the optical disk drive 20 may support optical disks in conformity with several standards.

In the above embodiments, it is described that the interface 38 is in conformity with the ATAPI standard, but the present invention is not limited to this, for example, the interface 38 may also be in conformity with one of the standards of ATA (AT Attachment), SCSI (Small Computer System Interface), USB (Universal Serial Bus) 1.0, USB 2.0, IEEE 1394, IEEE 802.3, serial ATA and serial ATAPI.

What is claimed is:

1. A wobbling signal demodulation method for demodulating a wobbling signal obtained based on light reflected from a recording surface of an optical disk having a wobbling track formed thereon, said wobbling signal including a carrier portion having a predetermined basic period and a phase demodulated wave portion including predetermined information, said wobbling signal demodulation method comprising:
    a first step of respectively integrating a portion of the wobbling signal corresponding to a first half of the basic period and a portion of the wobbling signal corresponding to a second half of the basic period in synchronization with a clock signal generated from the carrier portion;
    a second step of generating a digital signal based on at least one digital value related to a first integration result corresponding to the first half of the basic period and at least one digital value related to a second integration result corresponding to the second half of the basic period; and
    a third step of performing a phase demodulation on the phase demodulated wave portion of the wobbling signal based on the digital signal and the clock signal.

2. The wobbling signal demodulation method as claimed in claim 1, wherein in the first step, the integration is performed at a processing speed in accordance with a rotational speed of the optical disk.

3. The wobbling signal demodulation method as claimed in claim 1, wherein in the first step, the integration is performed at a processing speed in accordance with a phase in the basic period.

4. A wobbling signal demodulation circuit for demodulating a wobbling signal obtained based on light reflected from a recording surface of an optical disk having a wobbling track formed thereon, said wobbling signal including a carrier portion having a predetermined basic period and a phase demodulated wave portion including predetermined information, said wobbling signal demodulation circuit comprising:
    an integration signal generation circuit that respectively integrates a portion of the wobbling signal corresponding to a first half of the basic period and a portion of the wobbling signal corresponding to a second half of the basic period in synchronization with a clock signal generated from the carrier portion, and generates an integration signal including information of a first integration result corresponding to the first half of the basic period and information of a second integration result corresponding to the second half of the basic period;
    a digital signal generation circuit that generates a digital signal based on at least one digital value corresponding to the first integration result and at least one digital value corresponding to the second integration result; and
    a phase demodulation circuit that performs a phase demodulation on the phase demodulated wave portion of the wobbling signal based on the digital signal and the clock signal.

5. The wobbling signal demodulation circuit as claimed in claim 4, wherein the integration signal generation circuit comprises:
    a first integration circuit that integrates the portion of the wobbling signal corresponding to the first half of the basic period;
    a second integration circuit that integrates the portion of the wobbling signal corresponding to the second half of the basic period; and
    a selection circuit that selects an output signal from the first integration circuit in synchronization with the first half of the basic period, and selects an output signal from the second integration circuit in synchronization with the second half of the basic period.

6. The wobbling signal demodulation circuit as claimed in claim 5, wherein
    the integration signal generation circuit further comprises:
    a first sample-and-hold circuit that is connected to an output end of the first integration circuit and performs sampling and holding near a peak of an output signal from the first integration circuit; and
    a second sample-and-hold circuit that is connected to an output end of the second integration circuit and performs sampling and holding near a peak of an output signal from the second integration circuit.

7. The wobbling signal demodulation circuit as claimed in claim 4, further comprising an integration speed adjustment circuit that adjusts an integration processing speed in the integration signal generation circuit in accordance with a phase in the basic period.

8. An optical disk drive for performing at least one of operations of recording, reproducing, and erasing data in an optical disk having a wobbling track formed thereon, the optical disk drive comprising:
    a wobbling signal demodulation circuit that demodulates a wobbling signal obtained based on light reflected from a recording surface of the optical disk, said wobbling signal including a carrier portion having a predetermined basic period and a phase demodulated wave portion including predetermined information; and
    a data recording unit that determines a recording position based on position information of the wobbling track, and records data in the optical disk, said position information being obtained from an output signal from the wobbling signal demodulation circuit,
    wherein the wobbling signal demodulation circuit includes:
    an integration signal generation circuit that respectively integrates a portion of the wobbling signal corresponding to a first half of the basic period and a portion of the wobbling signal corresponding to a second half of the basic period in synchronization with a clock signal generated from the carrier portion, and generates an integration signal including information of a first integration result corresponding to the first half of the basic period and information of a second integration result corresponding to the second half of the basic period;
    a digital signal generation circuit that generates a digital signal based on at least one digital value corresponding to the first integration result and at least one digital value corresponding to the second integration result; and a phase demodulation circuit that performs a phase demodulation on the phase demodulated wave portion of the wobbling signal based on the digital signal and the clock signal.

9. The optical disk drive as claimed in claim 8, further comprising an integration speed setting unit that sets an integration processing speed in the integration signal generation circuit according to a rotational speed of the optical disk.

10. The optical disk drive as claimed in claim 8, wherein the optical disk is in conformity with a DVD+R standard or a DVD+RW standard.

* * * * *